United States Patent
Kim et al.

(10) Patent No.: US 11,787,452 B2
(45) Date of Patent: Oct. 17, 2023

(54) SYSTEMS AND METHODS FOR ANALYZING A RAIL

(71) Applicant: Ensco, Inc., Springfield, VA (US)

(72) Inventors: Anthony Kim, Fairfax, VA (US); David G. Ford, Fairfax, VA (US); Jeffrey Bloom, Silver Spring, MD (US)

(73) Assignee: Ensco, Inc., Springfield, VA (US)

( * ) Notice: Subject to any disclaimer, the term of this patent is extended or adjusted under 35 U.S.C. 154(b) by 0 days.

(21) Appl. No.: 18/104,497

(22) Filed: Feb. 1, 2023

(65) Prior Publication Data

US 2023/0174122 A1 Jun. 8, 2023

Related U.S. Application Data

(63) Continuation of application No. 16/705,137, filed on Dec. 5, 2019, now Pat. No. 11,590,992.
(Continued)

(51) Int. Cl.
*B61K 9/08* (2006.01)
*B61L 23/04* (2006.01)
(Continued)

(52) U.S. Cl.
CPC .............. *B61K 9/08* (2013.01); *B61L 23/041* (2013.01); *B61L 23/042* (2013.01); *E05F 15/70* (2015.01);
(Continued)

(58) Field of Classification Search
CPC ....... B61L 23/041; B61L 23/042; B61K 9/08; E05F 15/70; E05Y 2900/51; G01N 21/55;
(Continued)

(56) References Cited

U.S. PATENT DOCUMENTS

| 1,601,080 A | 9/1926 | Spencer |
| 3,349,906 A | 10/1967 | Calhoun |

(Continued)

FOREIGN PATENT DOCUMENTS

| CN | 108974051 A | 12/2018 |
| EP | 1118834 B1 | 4/2006 |

OTHER PUBLICATIONS

Deutzer Technische Kohle, "Third Rail Measurement," Web page, <http://deutzer.de/en/services-en/u-bahn-en/350-dritteschieneubahn-en>, retrieved from the Internet on Jun. 4, 2020 (9 pages).
(Continued)

*Primary Examiner* — Zachary L Kuhfuss
(74) *Attorney, Agent, or Firm* — Nixon Peabody, LLP

(57) ABSTRACT

A deployable measurement system for analyzing a rail of a railroad track includes a housing, a reflecting assembly coupled to the housing, a movement assembly coupled to the housing, and an optical measurement system disposed within the housing. Both the housing and the reflecting assembly are moveable between a stored position and a deployed position. The movement assembly includes a deployment assembly that moves the reflecting assembly from the stored position to the deployed position, and a retraction assembly that moves the reflecting assembly from the deployed position to the stored position. The optical measurement system emits and receives light. The reflecting assembly reflects the emitted light toward the rail. The reflecting assembly reflects light reflected off of the rail toward the optical measurement system. The light received by the optical measurement system is used to measure parameters related to the rail.

20 Claims, 30 Drawing Sheets

Related U.S. Application Data

(60) Provisional application No. 62/776,383, filed on Dec. 6, 2018.

(51) Int. Cl.
    *E05F 15/70*      (2015.01)
    *G01N 21/55*      (2014.01)
    *G02B 7/182*      (2021.01)
    *G01N 21/95*      (2006.01)

(52) U.S. Cl.
CPC ............ *G01N 21/55* (2013.01); *G01N 21/95* (2013.01); *G02B 7/182* (2013.01); *E05Y 2900/51* (2013.01); *G01N 2201/0216* (2013.01); *G01N 2201/068* (2013.01)

(58) Field of Classification Search
CPC .......... G01N 21/95; G01N 2201/0216; G01N 2201/068; G02B 7/182; G02B 7/184
See application file for complete search history.

(56) References Cited

U.S. PATENT DOCUMENTS

| | | | |
|---|---|---|---|
| 4,183,672 A | 1/1980 | Raber | |
| 11,590,992 B2 * | 2/2023 | Kim | ........................ G01N 21/55 |
| 2004/0207938 A1 | 10/2004 | Englander | |
| 2009/0073428 A1 | 3/2009 | Magnus | |
| 2011/0181721 A1 | 7/2011 | Bloom | |
| 2013/0176435 A1 | 7/2013 | Haas | |
| 2014/0029075 A1 | 1/2014 | Bayha | |
| 2014/0341435 A1 | 11/2014 | Shimada | |
| 2017/0106885 A1 | 4/2017 | Singh | |
| 2019/0054941 A1 | 2/2019 | Hydro | |

OTHER PUBLICATIONS

Deutzer Technische Kohle, "Third Rail Wear," Web page, <http://deutzer.de/en/services-en/u-bahn-en/351-dsvubahn-en>, retrieved from the Internet on Jun. 4, 2020 (8 pages).

KLD Labs, "Third Rail Monitoring," Web page, <http://www.kldlabs.com/?page_id=67>, retrieved from the Internet on Jun. 4, 2020 (2 pages).

Robat Kontrol, "Third Rail Measurement," Web page, <http://robat.com.tr/3rayolcum-en.html>, retrieved from the Internet on Jun. 4, 2020 (1 page).

DMA, "Third/Power Rail Measurement System (TRMS)," Web page, <https://www.air-rail.org/en/products/railway/brands/dma/third-power-rail-measurement-system-trms>, retrieved from the Internet on Aug. 5, 2020 (2 pages).

* cited by examiner

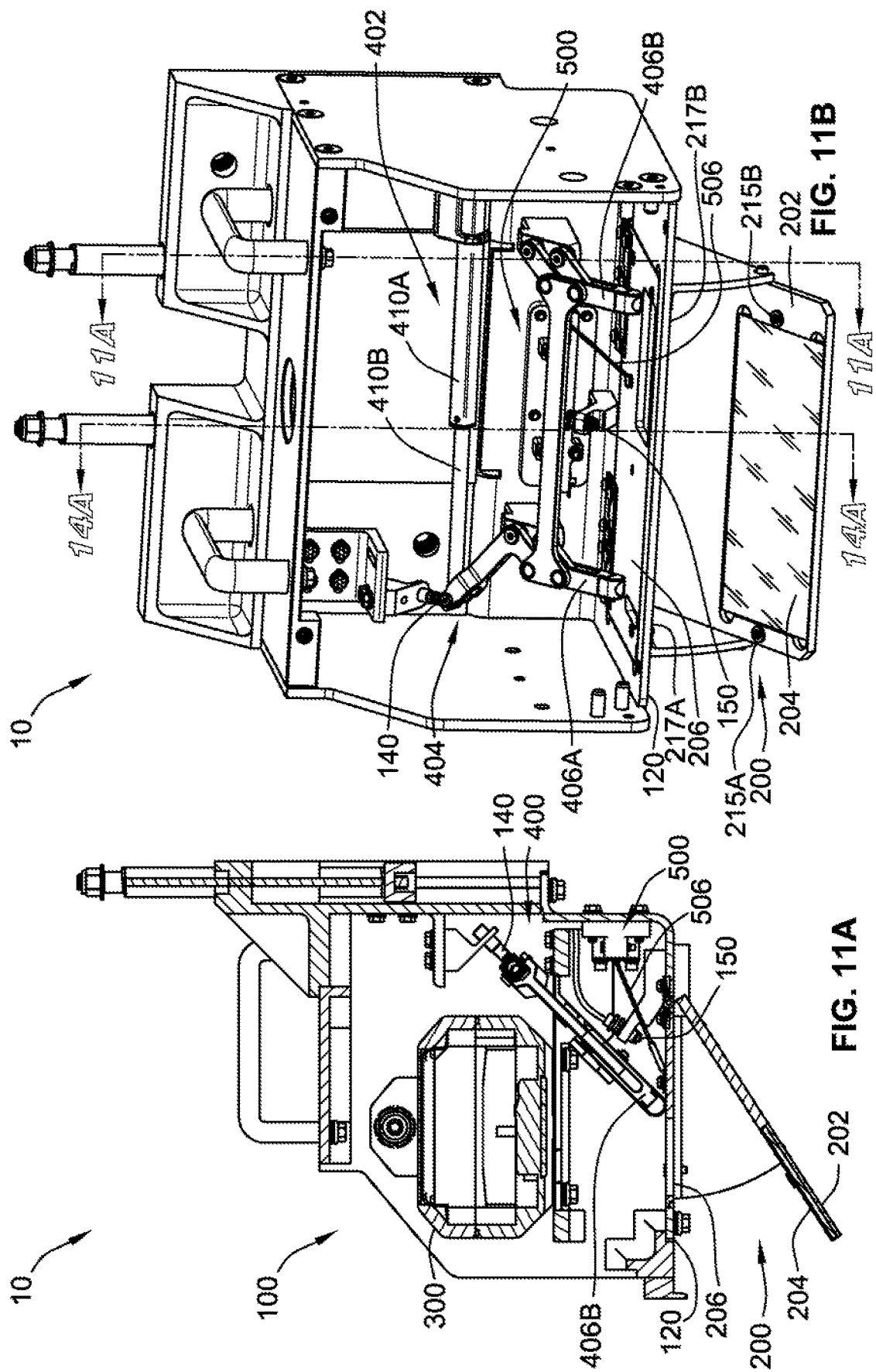

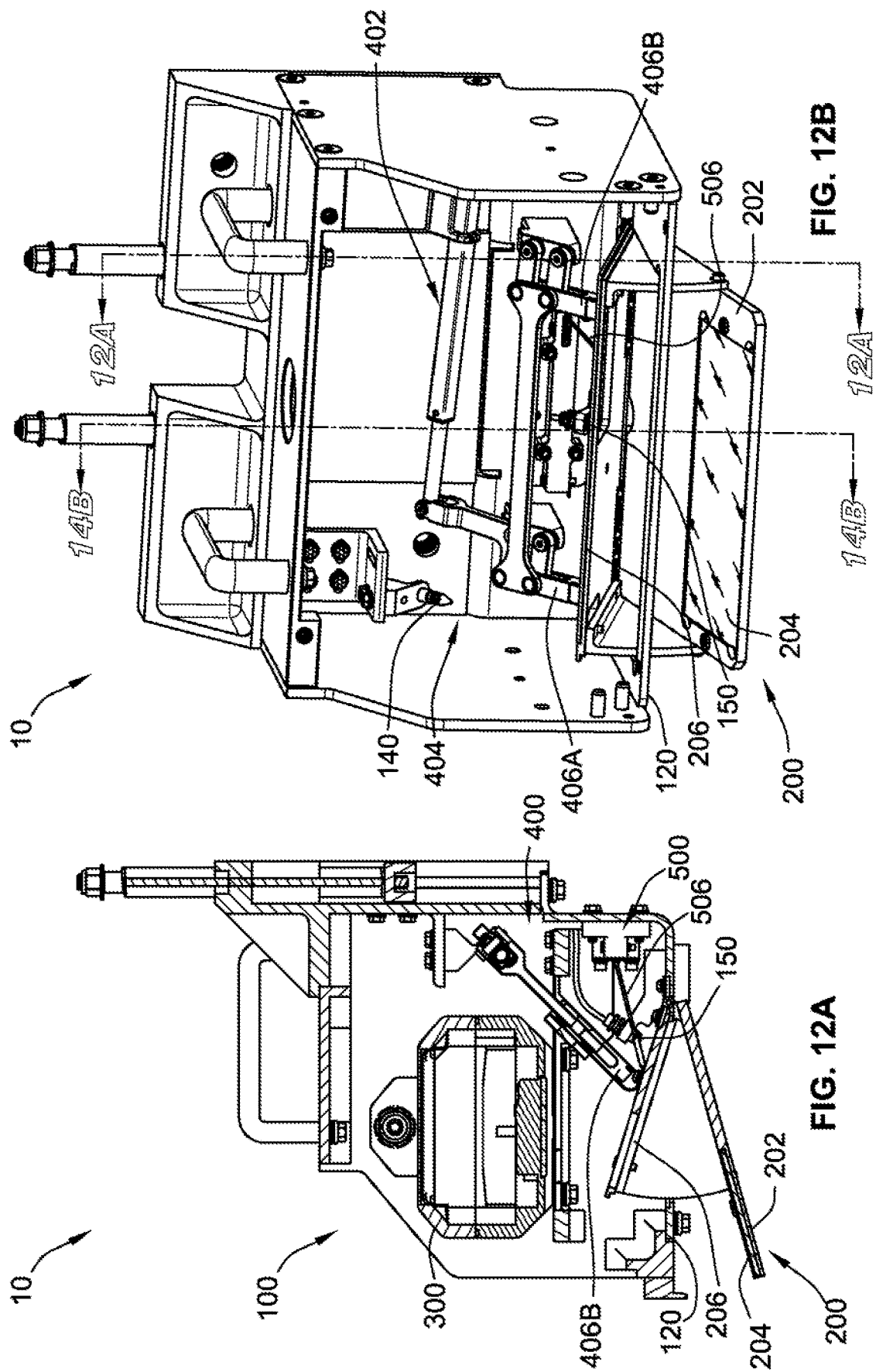

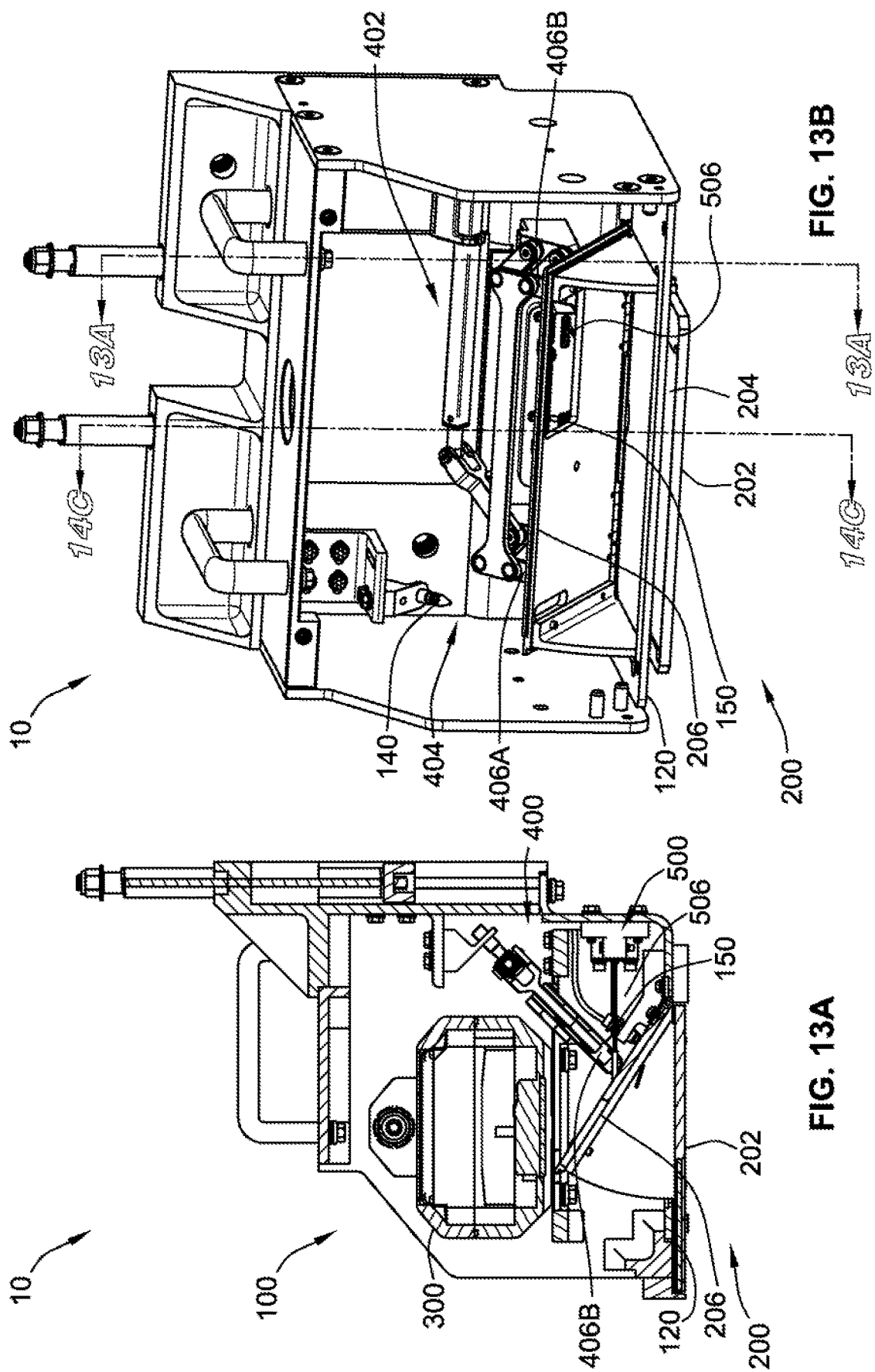

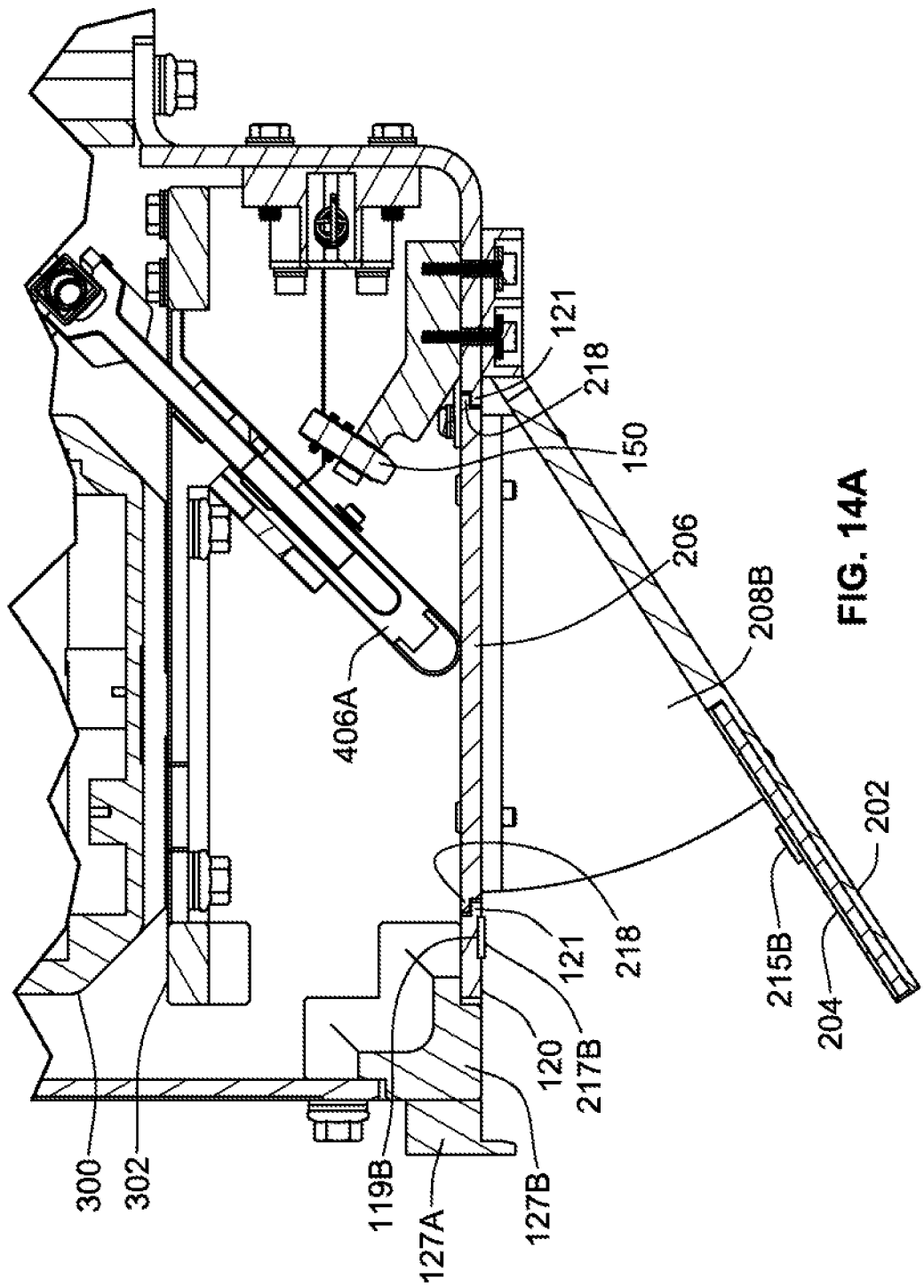

SYSTEMS AND METHODS FOR ANALYZING A RAIL

CROSS-REFERENCE TO RELATED APPLICATIONS

This application is a continuation of U.S. application Ser. No. 16/705,137, filed Dec. 5, 2019 which claims the benefit of U.S. Provisional Application No. 62/838,633, filed Apr. 25, 2019, the disclosure of each of which is hereby incorporated by reference herein in its entirety.

TECHNICAL FIELD

The present disclosure relates to rail inspection systems, and more particularly, to systems and methods for analyzing a rail.

BACKGROUND

Various types of railway tracks have two running rails upon which the railway vehicle is mounted, and a third rail that provides power to the railway vehicle. A conductive component extends from the vehicle to a contact surface of the rail so that electrical power is transferred to the railway vehicle. Certain types of third rails are inverted such that the contact surface of the rail faces towards the ground. Because of this inverted rail, it can be difficult to image or otherwise analyze the contact surface without placing fragile components beyond a clearance envelope of the vehicle. The present disclosure is directed to solving these problems and addressing other needs.

SUMMARY

A deployable measurement system comprises a housing configured to be coupled to a frame of a vehicle that is configured to move along a railroad track having a pair of running rails and a conducting rail; a reflecting assembly coupled to the housing such that the reflecting assembly is movable between a stored position and a deployed position, the reflecting assembly including a reflective element that is configured to reflect electromagnetic radiation incident thereon; a movement assembly coupled to the housing and being configured to cause the reflecting assembly to move (i) from the stored position to the deployed position, (ii) from the deployed position to the stored position, or (iii) both (i) and (ii); and an optical measurement system disposed within the housing and being configured to receive electromagnetic radiation that is reflected by the reflective element, the received electromagnetic radiation being associated with one or more parameters related to the conducting rail.

A deployable measurement system coupled to a vehicle configured to move along a railroad track comprises a housing; a reflecting assembly coupled to the housing such that the reflecting assembly is movable between a stored position and a deployed position; a deployment assembly coupled to the housing and being configured to cause the reflecting assembly to move from the stored position to the deployed position such that at least a portion of the reflecting assembly is positioned outside of the housing; and an optical measurement system disposed within the housing and being configured to receive electromagnetic radiation that is reflected by the reflecting assembly in response to the reflecting assembly being in the deployed position.

A deployable measurement system for analyzing a rail of a railroad track comprises a housing configured to be coupled to a frame of a vehicle that is configured to move along the railroad track, the housing being movable between a stored position and a deployed position, the housing including a base, two opposing side walls, two opposing end walls, and a lid, the base of the housing having an opening that forms a lip about at least a portion of the periphery of the opening; a reflecting assembly coupled to the housing such that the reflecting assembly is movable between a stored position and a deployed position, the reflecting assembly including: a base plate; a reflective element coupled to the base plate, the reflective element being positioned at a non-zero angle relative to the base of the housing when the reflecting assembly is in the deployed position; an aperture plate having one or more apertures, the aperture plate having a flange about at least a portion of the periphery of the aperture plate that is configured to engage the lip of the opening in the base of the housing in response to the reflecting assembly being in the deployed position; and a first side bracket coupled to (i) a first end of the aperture plate via one or more first fasteners and (ii) a first end of the base plate via one or more second fasteners; a second side bracket coupled to (i) a second opposing end of the aperture plate via the one or more of the first fasteners and (ii) a second opposing end of the base plate via one or more of the second fasteners, the one or more first fasteners being configured to permit the first and second side brackets to detach from the aperture plate in response to a first force greater than a first detachment threshold force being imparted on the base plate, the first side bracket, the second side bracket, or any combination thereof; a retraction assembly coupled between the housing and the reflecting assembly such that the retraction assembly imparts a retraction force on the reflecting assembly to bias the reflecting assembly to the stored position; a deployment assembly coupled to the housing and being configured to exert a deployment force on the aperture plate of the reflecting assembly that is sufficient to overcome the retraction force of the retraction assembly and cause the reflecting assembly to move from the stored position to the deployed position; and an optical measurement system disposed within the housing, the optical measurement system being configured to generate data indicative of one or more parameters related to the rail.

The foregoing and additional aspects and implementations of the present disclosure will be apparent to those of ordinary skill in the art in view of the detailed description of various embodiments and/or implementations, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

FIG. 11A is a cross-sectional view of the housing with the reflecting assembly in the deployed position, taken along line 11A-11A of FIG. 11B, according to aspects of the present disclosure;

FIG. 11B is an internal perspective view of the housing with the reflecting assembly in the deployed position, according to aspects of the present disclosure;

FIG. 12A is a cross-sectional view of the housing with the reflecting assembly between the deployed position and the stored position, taken along line 12A-12A of FIG. 12B, according to aspects of the present disclosure;

FIG. 12B is an internal perspective view of the housing with the reflecting assembly between the deployed position and the stored position, according to aspects of the present disclosure;

FIG. 13A is a cross-sectional view of the housing with the reflecting assembly in the stored position, taken along line 13A-13A of FIG. 13B, according to aspects of the present disclosure;

FIG. 13B is an internal perspective view of the housing with the reflecting assembly in the stored position, according to aspects of the present disclosure;

FIG. 14A is a zoomed-in cross-sectional view of the housing with the reflecting assembly in the deployed position, taken along line 14A-14A of FIG. 11B, according to aspects of the present disclosure;

Figure 1:
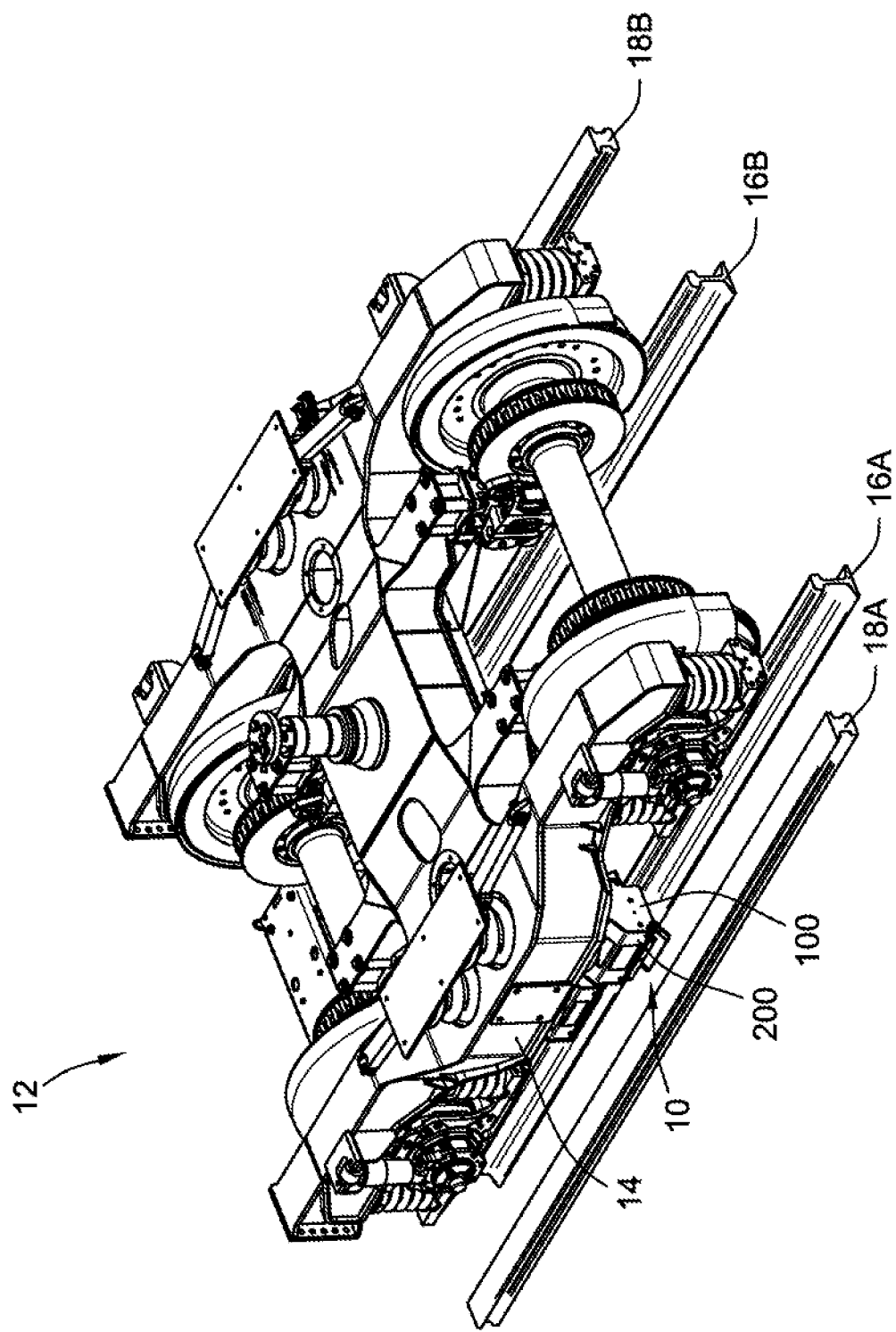
FIG. 1 is a perspective view of a vehicle traveling along a railroad track and a system including a housing and a reflecting assembly for analyzing a rail of the railroad track, according to aspects of the present disclosure.

While the present disclosure is susceptible to various modifications and alternative forms, specific implementations and embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

Referring now to FIG. 1, a deployable measurement system 10 for analyzing a rail of a railroad track can be coupled to a vehicle 12 that moves along the railroad track. The vehicle 12 generally travels on left and right running rails 16A and 16B. The railroad track can include additional rails, such as rails 18A and 18B that are positioned outside of the running rails 16A, 16B. These rails 18A, 18B may be electrified rails that supply electrical power or current to the vehicle 12 through direct physical contact between a portion of the vehicle (such as a conducting element or shoe) 12 and a shoe engagement surface of the rail. The rails 18A, 18B may be used for other purposes as well. The system 10 can generally be used with any type of track, such as subway tracks, elevated train tracks, high speed rail tracks, monorail tracks, tram tracks, standard railroad tracks, etc. The system 10 can also be adapted to work with tracks having any number of rails.

In some implementations, the surface of the rail that is being analyzed is the underside of the rail. For example, the third and/or fourth rails 18A, 18B that can provide power to the vehicle 12 are often inverted, in that they are mounted such that their top surface is attached to a frame that holds the rail in place, while the bottom surface of the rail is the shoe engagement surface that contacts the shoe of the vehicle 12. In other implementations, the top or side surface of the rails 18A, 18B are configured to contact the portion of the vehicle 12, and thus are the surfaces that must be analyzed by the system 10. Thus, the shoe engagement surface of rails 18A, 18B in some implementations faces the opposite direction as compared to a wheel engagement surface of rails 16A, 16B upon which the vehicle 23 is mounted.

Other implementations may analyze the top or side of the rail, or any combination of the top, side, or underside of the rail. The system 10 can also be generally utilized with any type of rail, such as the running rails 16A and 16B, the additional rails 18A and 18B that supply electrical power, guard rails, guide rails, or any other type of rail that may need to be analyzed. The vehicle upon which the system 10 is mounted can be any type of vehicle that can move along the rails of a railroad track, such as a train car, a truck, specially modified vehicles, etc.

The system 10 includes a housing 100 that is moveably attached to a frame 14 of the vehicle 12. The housing 100 is generally coupled to the frame 14 in such a manner as to allow the housing 100 to move between a stored position and a deployed position. In some implementations, the housing 100 moves in a generally vertical direction between the two positions, such that the housing 100 is simply raised into the stored position and lowered into the deployed position. In other implementations, the housing 100 may be pivotably or hingedly coupled to the frame 14. In still other implementations, the housing 100 is in a fixed position relative to the frame 14 and does not move between positions, but instead is held constant during operation.

An optical measurement system 300 (see FIG. 6B) is disposed within the housing 100. The optical measurement system can be used to analyze, measure, inspect, etc. any of the rails of the railroad track and generate desired parameters related to the rails. In FIG. 1, the housing 100 containing the optical measurement system is positioned adjacent to additional rail 18A, and can thus be used to analyze rail 18A. As is discussed in further detail herein, the optical measurement system 300 generally includes an electromagnetic radiation source (such as a laser or other visible light source) and an optical sensor (such as a camera or other image sensor). The electromagnetic radiation source is generally configured to shine light on the rail surface that is being analyzed, while the optical sensor is configured to capture an image of this light being shone upon the rail surface In some implementations, the railroad track only has a single additional rail (such as rail 18A) to be analyzed, and thus there is only one housing 100 with an internal optical measurement system to analyze the rail. In other implementations, the railroad track may include multiple additional rails to be analyzed (such as rails 18A and 18B). In these implementations, the vehicle 12 includes two (or more) housings 100 coupled to the frame 14 on either side of the vehicle 12, all containing an internal optical measurement system. This allows the system 10 to analyze both of the additional rails simultaneously. In still other implementations, the railroad track may include multiple additional rails to be analyzed that are all located on one side of the railroad track. In these implementations, the vehicle 12 includes two (or more) housings 100 coupled to the frame 14 on one side of the vehicle 12, all containing an internal optical measurement system.

The system 10 includes a reflecting assembly 200 that is used to direct electromagnetic radiation emitted and received by the optical measurement system to the appropriate location. In certain implementations, the location of the rail 18A to be analyzed relative to the vehicle 12 and the housing 100 makes it difficult or impossible for the optical measurement system to be aimed directly at the rail. The reflecting assembly 200 can be used to reflect the electromagnetic radiation emitted by the electromagnetic radiation source of the optical measurement system toward a desired location (e.g., the surface of the rail 18A), and can also be used to reflect the electromagnetic radiation into the optical sensor of the optical measurement system 10. This allows the optical measurement system to analyze the rail 18A, even though rail 18A is not positioned directly underneath the optical measurement system.

Similar to the housing 100, the reflecting assembly 200 is moveable between a stored position and a deployed position. When both the housing 100 and the reflecting assembly 200 are in the deployed position, the optical measurement system can be used to analyze the rail of interest, such as rail 18A. The reflecting assembly 200 can move to the stored position should there be any debris or other foreign objects either on the railroad track or in the general area that may cause damage to the reflecting assembly 200 when in the deployed position. As explained in more detail herein, the reflecting assembly 200 can be pivotably coupled to the housing 100 such that it is pivotably moveable between the stored position and the deployed position. In other implementations, the reflecting assembly 200 can be moved up and down in a generally vertical direction between the stored and deployed positions. In still other implementations, the reflecting assembly 200 may be fixed in the stored position such that the reflecting assembly does not move.

Figure 2:
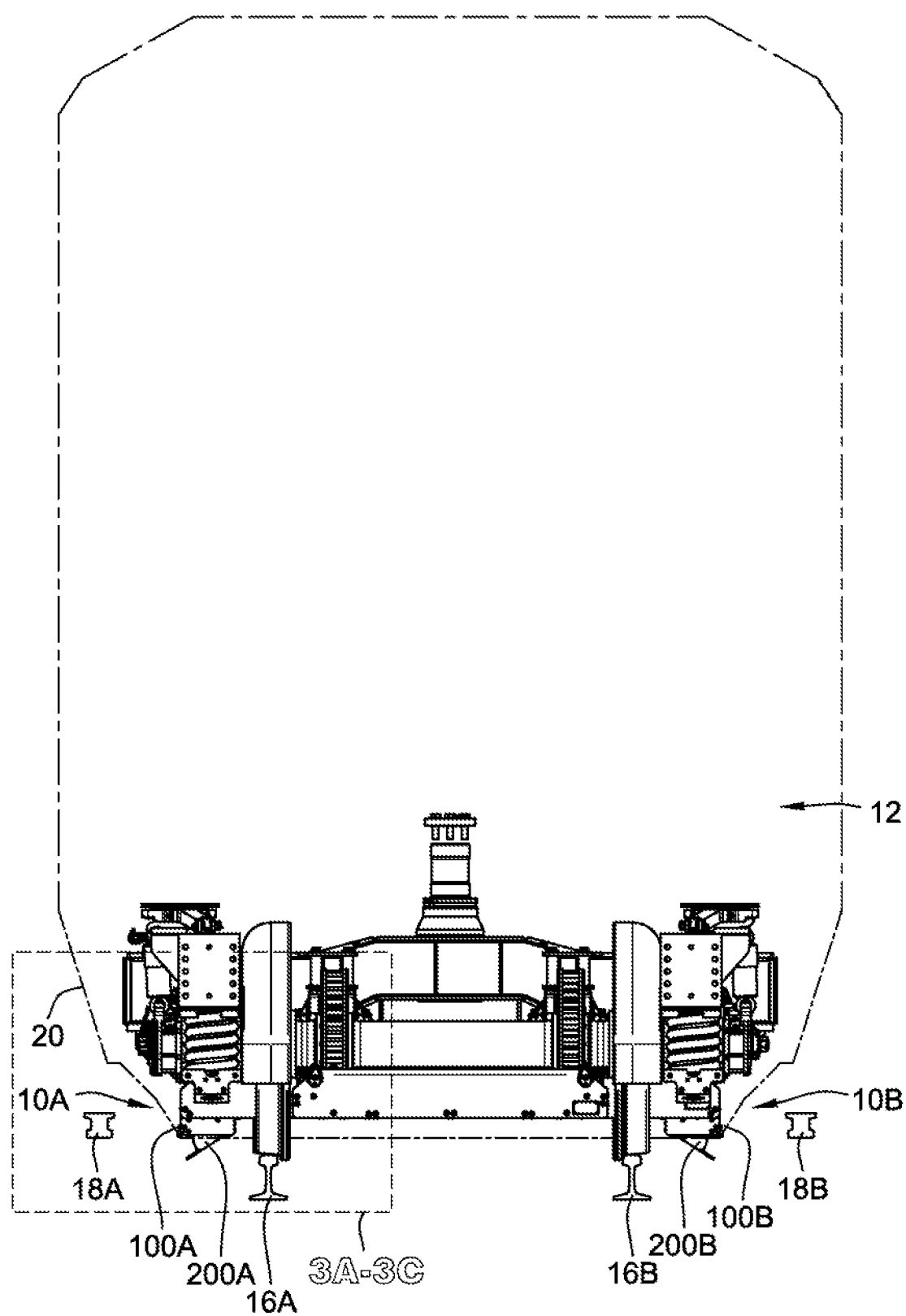
FIG. 2 is an end view of the vehicle and system of FIG. 1, according to aspects of the present disclosure.

FIG. 2 shows a front or back view of a vehicle 12 looking along the longitudinal dimension of the railroad track, e.g., parallel to the direction of travel of the vehicle 12. FIG. 2 shows the clearance envelope 20 of the vehicle 12 as the vehicle 12 travels along running rails 16A and 16B. The clearance envelope 20 is the two-dimensional cross-sectional area that will generally be free from debris or other foreign objects during operation of the vehicle 12. Generally, a large portion of the clearance envelope is occupied by the remaining structure of the vehicle 12, which is not shown in FIG. 2. However, the clearance envelope 20 generally extends beyond the outer periphery of the vehicle 12 to allow for movement of the vehicle 12 (for example swaying in a lateral direction), or for any components that may be added to the stock vehicle 12 and extend beyond the outer periphery of the stock vehicle 12.

As is shown in FIG. 2, the vehicle 12 can include two deployable measurement systems 10A and 10B. System 10A includes a first housing 100A containing an optical measurement system (not shown) used to analyze rail 18A. System 10B includes a second housing 100B that contains an optical measurement system (not shown) used to analyze rail 18B. The housings 100A, 100B are coupled to the frame 14, and are generally positioned within the clearance envelope 20. However, reflecting assemblies 200A and 200B, when in the deployed position, generally extend beyond the clearance envelope 20. While two deployable measurement systems are shown in FIG. 2, the vehicle 12 could utilize any number of deployable measure systems, including one, two, or more.

Figure 3A:
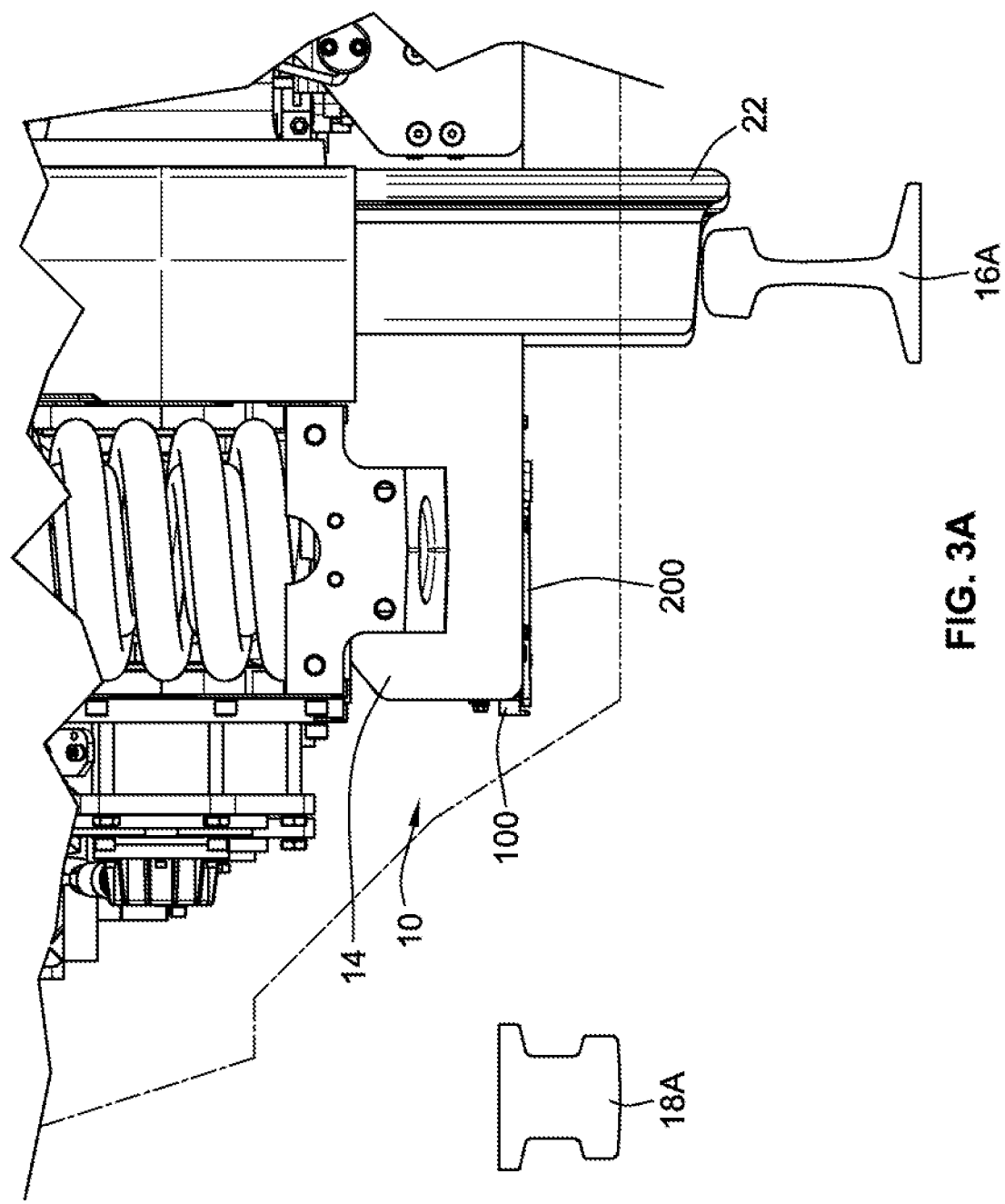
FIG. 3A is an end view of the vehicle and system of FIG. 1 showing the housing in a stored position and the reflecting assembly in a stored position, according to aspects of the present disclosure.
Figure 3B:
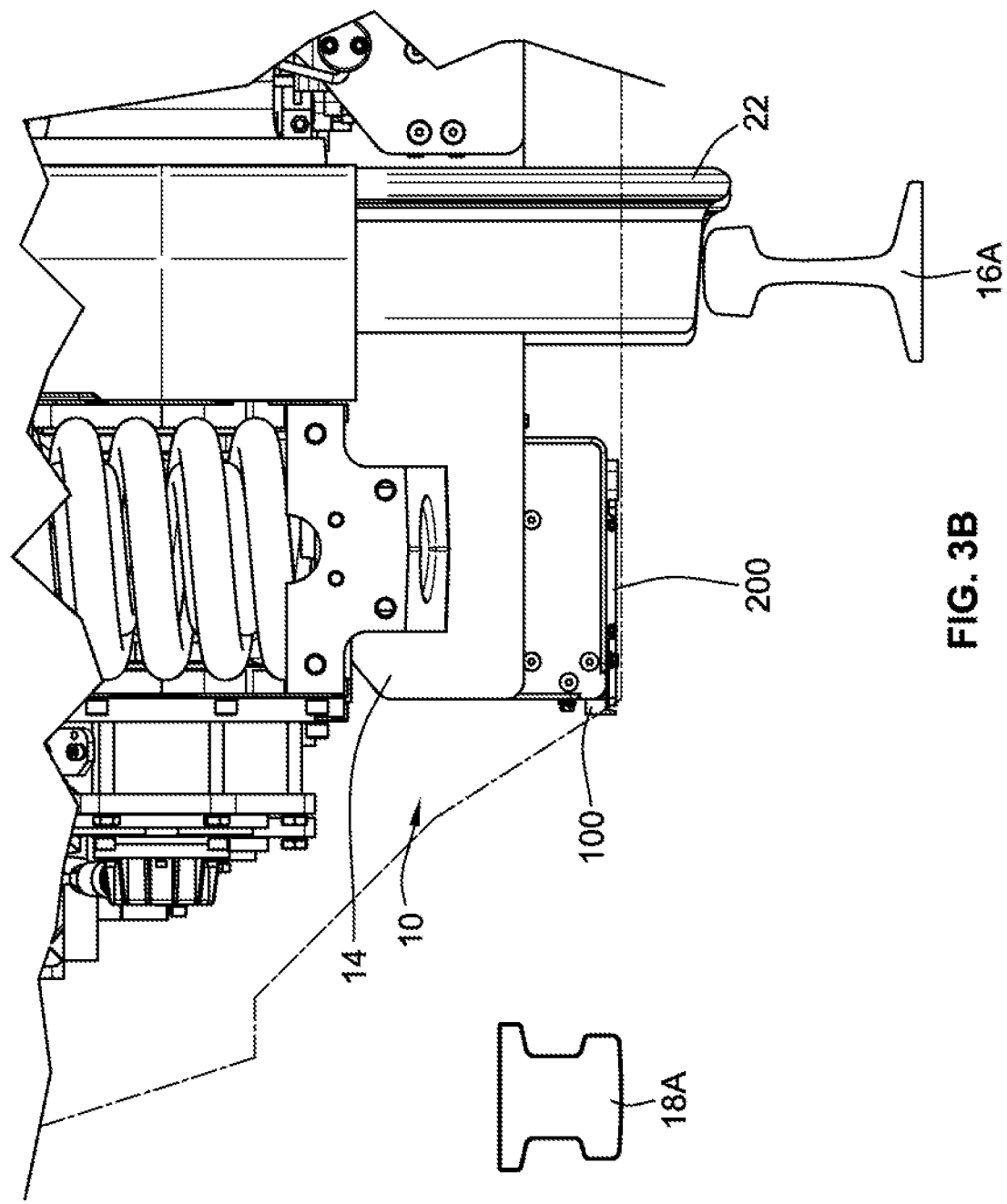
FIG. 3B is an end view of the vehicle and system of FIG. 1 showing the housing in a deployed position and the reflecting assembly in the stored position, according to aspects of the present disclosure.
Figure 3C:
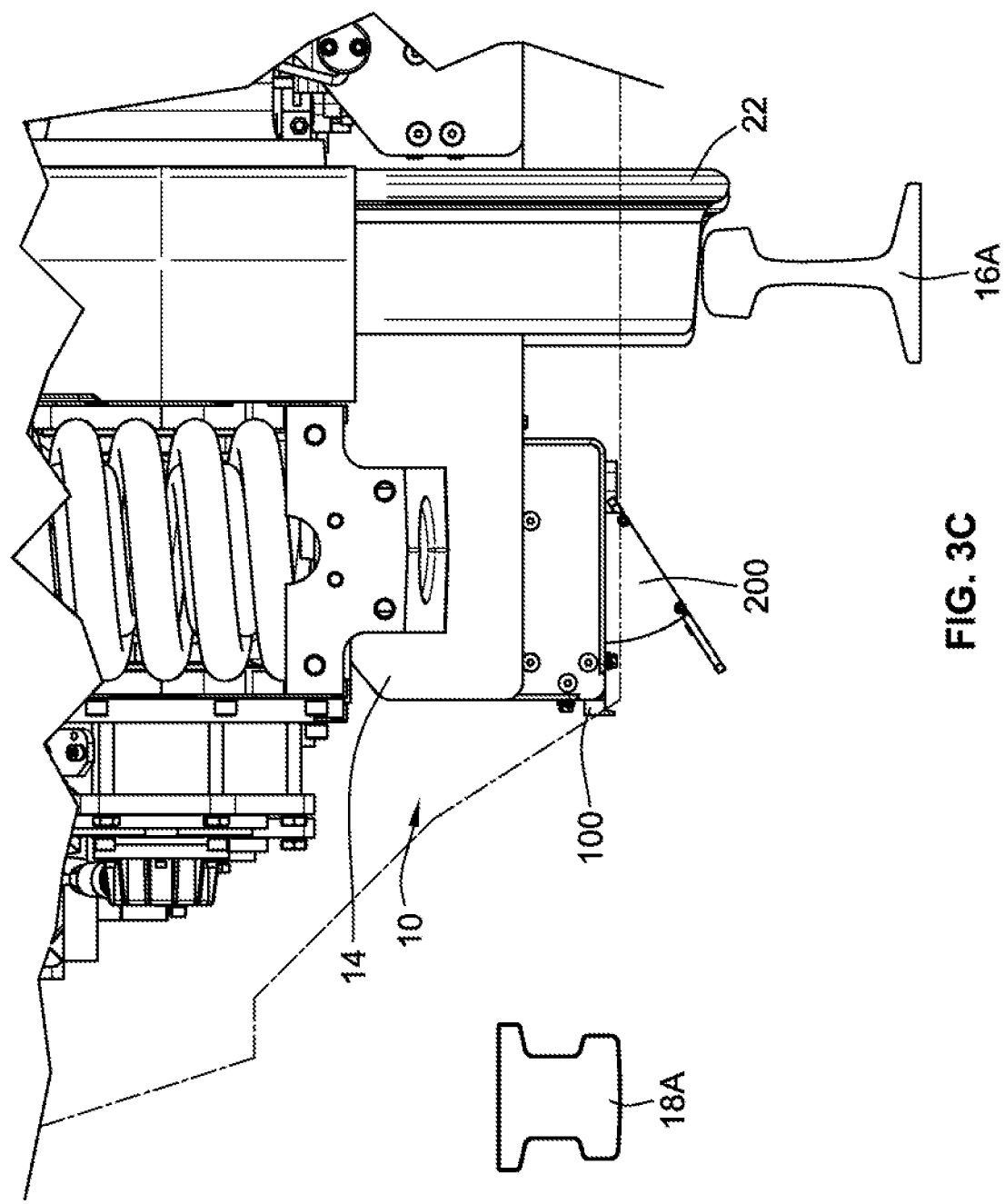
FIG. 3C is an end view of the vehicle and system of FIG. 1 showing the housing in the deployed position and the reflecting assembly in a deployed position, according to aspects of the present disclosure.

Zoomed-in views of the indicated area of FIG. 2 are shown in FIGS. 3A-3C. FIGS. 3A-3C show the stored and deployed positions of both the housing 100 and the reflecting assembly 200 as a wheel 22 of the vehicle 12 rests upon an upper wheel engagement surface of the running rail 16A. In FIG. 3A, the housing 100 and the reflecting assembly 200 are in their stored positions. The housing 100 is raised such that it is generally positioned level with the frame 14, while the reflecting assembly 200 is pivoted upwards toward the housing 100. As shown in FIG. 3A, both the housing 100 and the reflecting assembly 200 remain within the clearance envelope 20 of the vehicle 12 when in their stored positions.

FIG. 3B shows the housing 100 lowered into its deployed position, while the reflecting assembly 200 remains in its stored position. When the housing 100 moves to its deployed position, the bottom surface of the housing generally extends below the bottom edge of the frame 14. However, the housing 100 remains within the clearance envelope 20 of the vehicle 12. Thus, even when the housing 100 is moved to its deployed position, there is a very low risk that the housing 100 will be impacted by any debris or other foreign objects surrounding the vehicle 12. The reflecting assembly 200 also remains within the clearance envelope 20 of the vehicle 12 when the housing 100 is lowered into its deployed position.

FIG. 3C shows both the housing 100 and the reflecting assembly 200 in their deployed positions. When the reflecting assembly 200 is moved to its deployed position, the reflecting assembly 200 will generally be angled towards the rail 18A that is being analyzed so that the optical measurement system can illuminate and image the rail. In its deployed position, a portion of the reflecting assembly 200 extends beyond the clearance envelope 20 of the vehicle 12. As is discussed in more detail herein, the reflecting assembly 200 is generally coupled to the housing 100 via fasteners that are configured to break away in response to a sufficient force being imparted on the reflecting assembly 200. This generally prevents the housing 100 from sustaining a substantial amount of damage, as much or all of the force is imparted to the reflecting assembly 200 and the break-away fasteners.

Figure 4A:
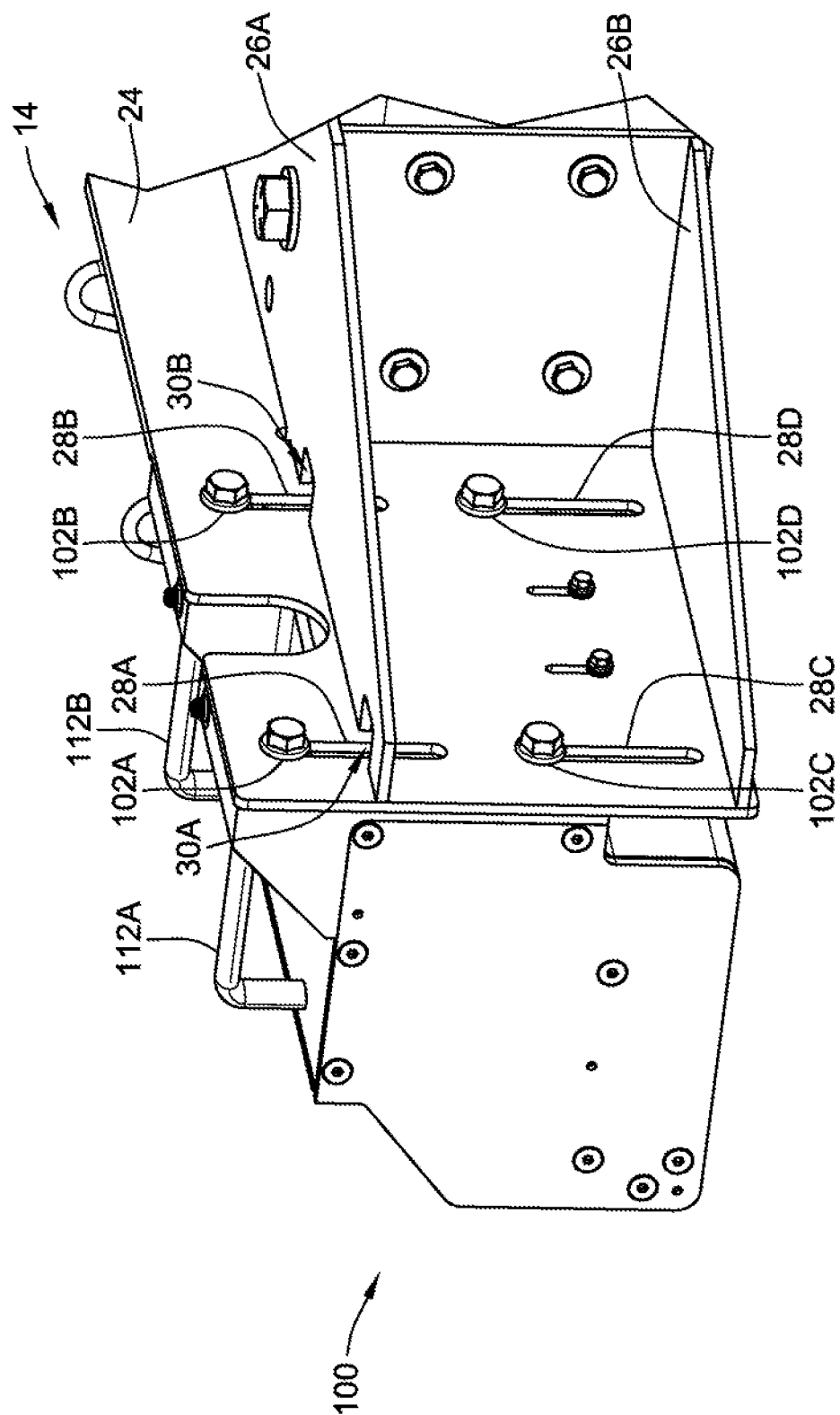
FIG. 4A is a perspective view of the housing coupled to a frame of the vehicle in the stored position with the reflecting assembly in the stored position, according to aspects of the present disclosure.
Figure 4B:
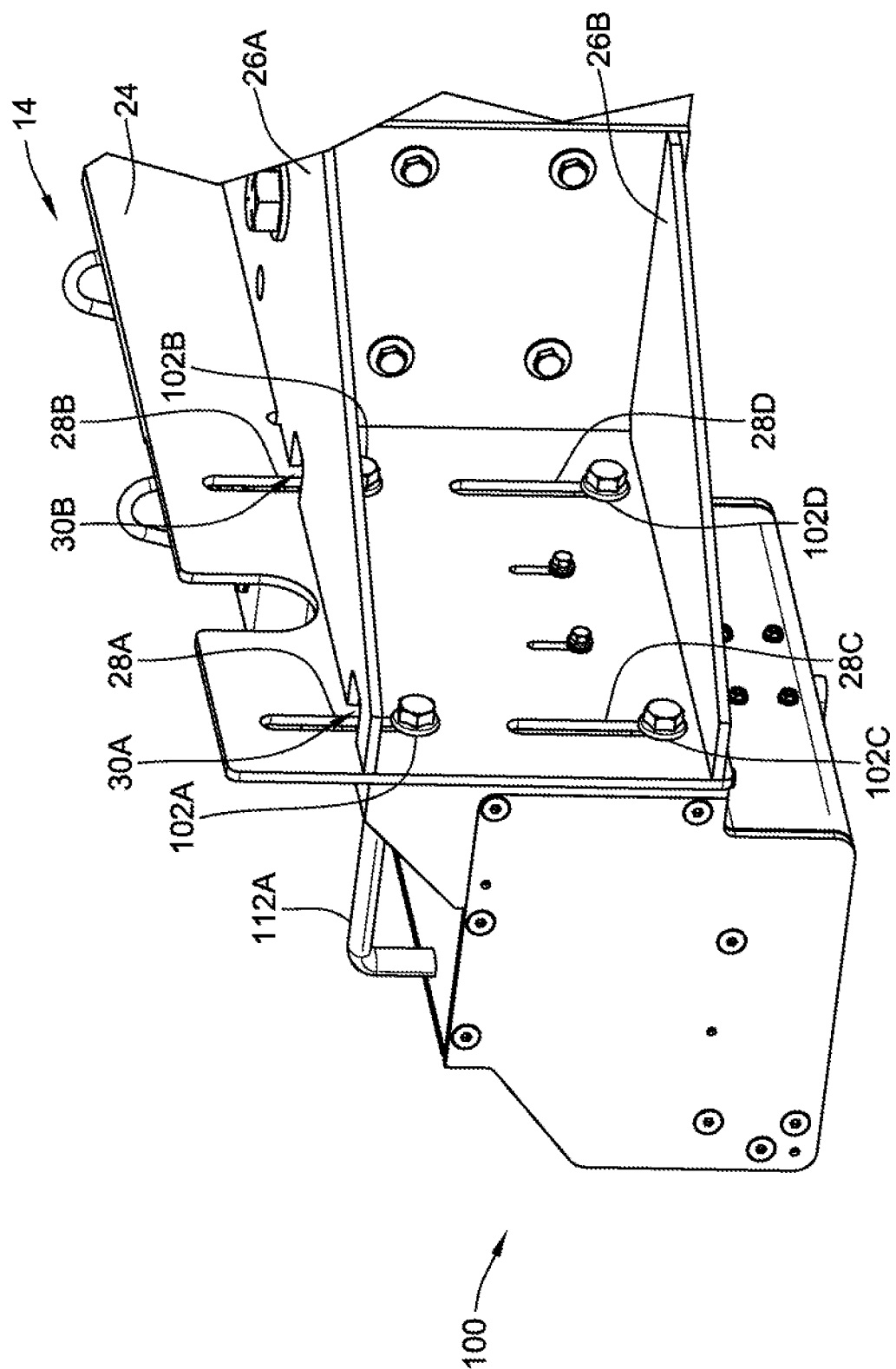
FIG. 4B is a perspective view of the housing coupled to the frame of the vehicle in the deployed position with the reflecting assembly in the stored position, according to aspects of the present disclosure.
Figure 4C:
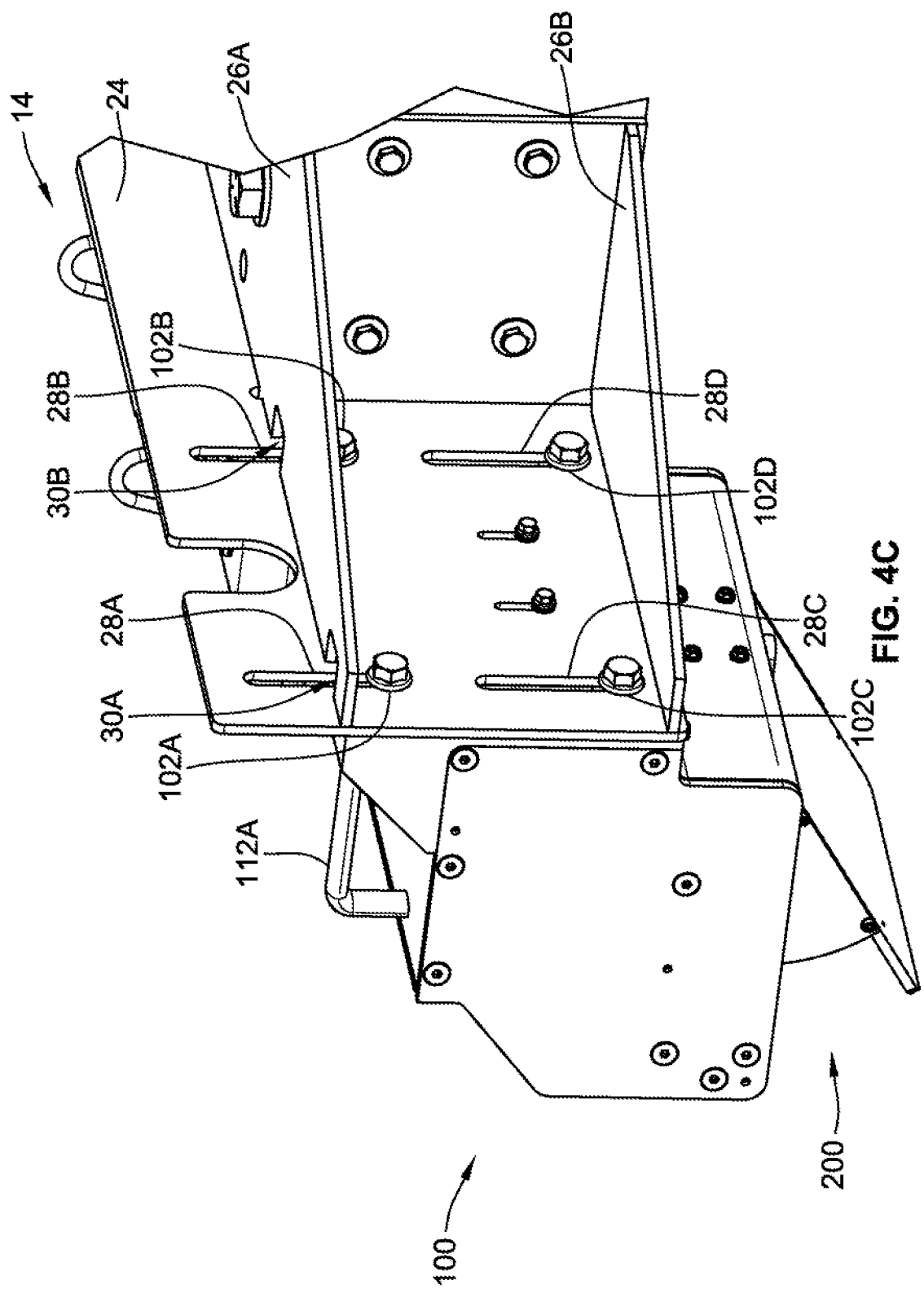
FIG. 4C is a perspective view of the housing coupled to the frame of the vehicle in the deployed position with the reflecting assembly in the deployed position, according to aspects of the present disclosure.

FIGS. 4A-4C show how the housing 100 is moved relative to the frame 14 from the stored position to the deployed position. The frame 14 includes a vertical wall 24 and two horizontal walls 26A and 26B that are coupled to the vertical wall 24. The vertical wall 24 defines fastener channels 28A-28D. Fasteners 102A-102D are configured to extend through the respective fastener channels 28A-28D, and can be secured to the vertical wall 24 to thereby secure the housing 100 to the frame 14. In some implementations, the fasteners 102A-102D are bolts with enlarged head portions and threaded ends. The threaded end can be inserted through one of the fastener channels 28A-28D and into a corresponding threaded aperture 114A-114C (see FIGS. 5A-5C) in the housing 100 such that the vertical wall 124 is positioned between the housing 100 and the head portions of the fasteners 102A-120D. By tightening the fasteners 102A-120D (for example by screwing them into the threaded apertures 114A-114C), the vertical wall 124 is secured between the housing 100 and the head portions of the fasteners 102A-120D, thereby coupling the housing 100 to the frame 14. Because the frame 14 is fixed relative to the remainder of the vehicle and the rail being analyzed, the housing 100 is thus locked into position relative to the rail being analyzed.

In other implementations, the fasteners 102A-120D have a second threaded end instead of an enlarged head portion. A nut with a threaded opening can then be fastened to the other threaded end of the fasteners 102A-120D to thereby secure the fasteners 102A-102D to the vertical wall 24, thereby securing the housing 100 to the frame 14. In other implementations, the fasteners 102A-102D can be integrally formed with the housing 100.

As shown in FIG. 4A, when the housing 100 is raised to the stored position, the fasteners 102A-102D are located the top ends of the fastener channels 28A-28D, and thus the housing 100 is coupled to a first upper portion of the frame. The horizontal wall 26A defines a pair of fastener notches 30A and 30B that allow the portion of the fasteners 102A and 102B extending through the fastener channels 28A and 28B to pass therethrough when raising and lowering the housing 100.

To move the housing 100 to the deployed position, the fasteners 102A-102D can be removed or loosened from the housing 100 to thereby unsecure the housing 100 from the vertical wall 24. The housing 100 can then be moved downwardly such that the fasteners 102A-102B are moved to the bottom of fastener channels 28A-28D, as shown in FIG. 4B. During this transition, the portion of fasteners 102A and 102B that extends through fastener channels 28A and 28B pass through the fastener notches 30A and 30B defined by the horizontal wall 26A.

Once the housing 100 has been moved downward to the deployed position, the fasteners 102A-102D can again be tightened to secure the housing 100 to the vertical wall 24 and couple the housing 100 to a second lower portion of the frame 14. The housing 100 is thus secured in the deployed position. The reflecting assembly 200 is in the stored position in FIGS. 4A and 4B. Once the housing 100 is moved to the deployed position, the reflecting assembly 200 can be moved to its deployed position, as shown in FIG. 4C.

Figure 5A:
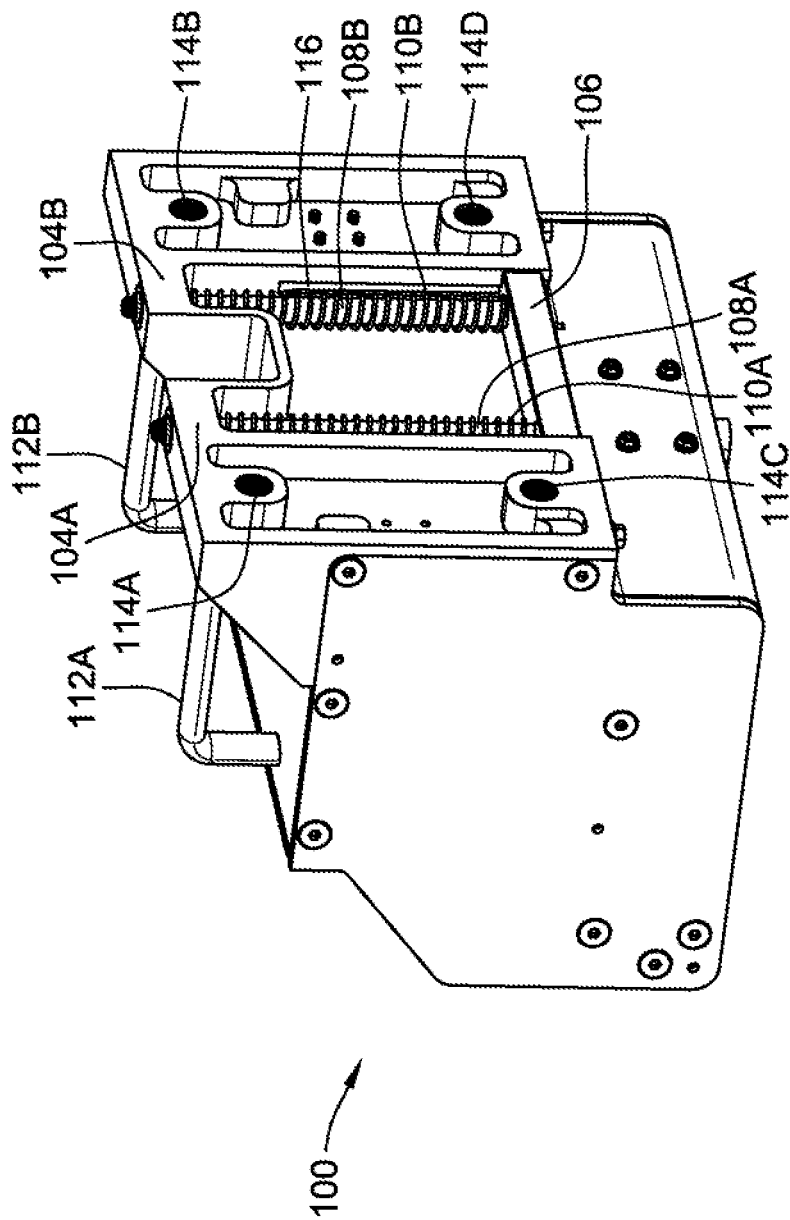
FIG. 5A is a perspective view of a mounting bracket assembly that couples the housing to the frame of the vehicle when the housing is in the stored position and the reflecting assembly is in the stored position, according to aspects of the present disclosure.
Figure 5B:
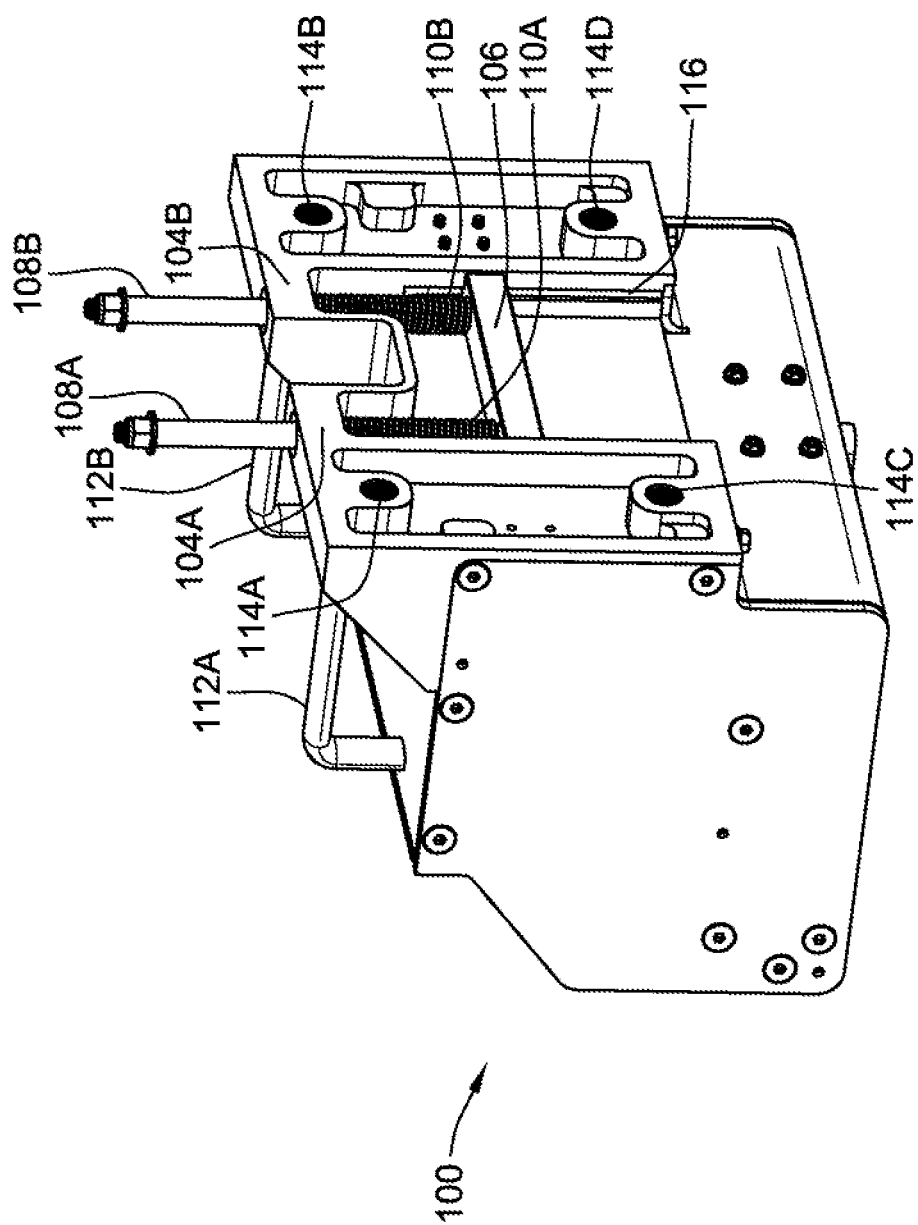
FIG. 5B is a perspective view of a mounting bracket assembly that couples the housing to the frame of the vehicle when the housing is in the deployed position and the reflecting assembly is in the stored position, according to aspects of the present disclosure.
Figure 5C:
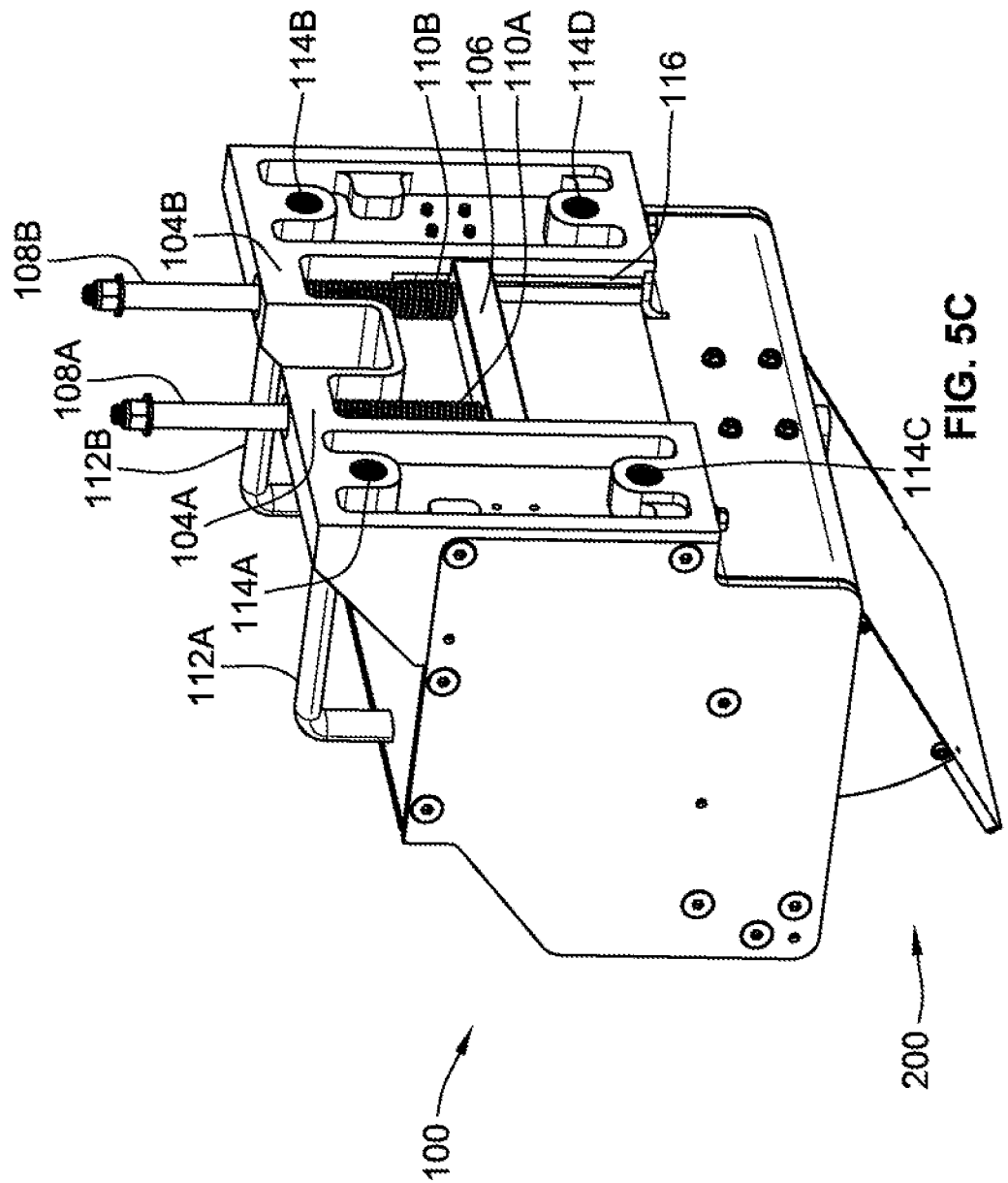
FIG. 5C is a perspective view of a mounting bracket assembly that couples the housing to the frame of the vehicle when the housing is in the deployed position and the reflecting assembly is in the deployed position, according to aspects of the present disclosure.

FIGS. 5A-5C show a mounting bracket assembly that is used to couple the housing 100 to the frame. The mounting bracket assembly includes a base element 106, linear guide shafts 108A and 108B that are attached to an extend from the base element 106, and springs 110A and 110B that are positioned on a portion of the linear guide shafts 108A and 108B. The base element 106 is generally fixed relative to the frame of the vehicle during operation. The linear guide shafts 108A and 108B extend upwards from the base element 106 and through corresponding apertures in upper flanges 104A and 104B of the housing 100. The springs 110A and 110B are fitted over the linear guide shafts 108A and 108B such that the springs 110A and 110B are positioned between the base element 106 and the upper flange 104 of the housing 100.

Because the base element 106 is fixed relative to the frame, and because the springs 110A and 110B have a spring constant, the springs 110A and 110B urge the housing 100 upwards toward the stored position. The springs 110A and 110B thus counterbalance at least a portion of the weight of the housing 100 and any internal components (such as the optical measurement system). In some implementations, the springs 110A and 110B counterbalance between about 5% and about 50% of the weight of the housing 100 and any internal components. In other implementations, the springs 110A and 110B counterbalance between about 10% and about 30% of the weight of the housing 100 and any internal components.

FIG. 5A shows the positions of the components of the mounting bracket assembly when the housing 100 is raised to the stored position. The base element 106 is fixed relative to the frame such what when the housing 100 is raised to the stored position, the springs 110A and 110B are not compressed. Once the housing 100 has been raised to the stored position (for example by utilizing handles 112A and 112B), the fasteners 102A-102B (see FIGS. 4A-4C) can be inserted through the fasteners channels 28A-28D (see FIGS. 4A-4C) and into corresponding fastener apertures 114A-114D to lock the housing 100 in the stored position.

FIG. 5B shows the positions of the components of the mounting bracket assembly when the housing 100 is lowered to the deployed position. Because the base element 106 is fixed relative to the frame, the downward movement of the housing 100 causes the upper flange 104 to contact the springs 110A and 110B, which are compressed between the upper flange 104 and the base element 106. Once the housing 100 reaches the deployed position, the fasteners 102A-102B can be inserted through the fasteners channels 28A-28D and into corresponding fastener apertures 114A-114D to lock the housing 100 in the deployed position.

The housing 100 can have base element channels 116 into which side portions of the base element 106 can be inserted. These side portions of the base element 106 travel vertically within the base element channels 116 as the housing 100 moves between the stored and deployed positions. Finally, FIG. 5C shows the reflecting assembly 200 in the deployed position. Once the housing 100 has been moved to its deployed position, the reflecting assembly can be pivoted to its deployed position.

Because the springs 110A and 110B are compressed when the housing 100 is in the deployed position, the springs 110A and 110B bias the housing 100 towards the stored position. Thus, when a user raises the housing 100 from the deployed position to the stored position (for example by grasping handles 112A and 112B), the springs 110A and 110B counterbalance at least a portion of the weight of the housing 100 and any internal components to make it easier for the user to lift the housing 100 to the stored positions. In some implementations, a manual or automatic actuator may be included as part of the mounting bracket assembly, in addition to or instead of any of the other components. These actuators can move the housing 100 between the stored and deployed positions. Fasteners other than or in addition to fasteners 102A-120D may be used with these actuators.

Figure 6A:
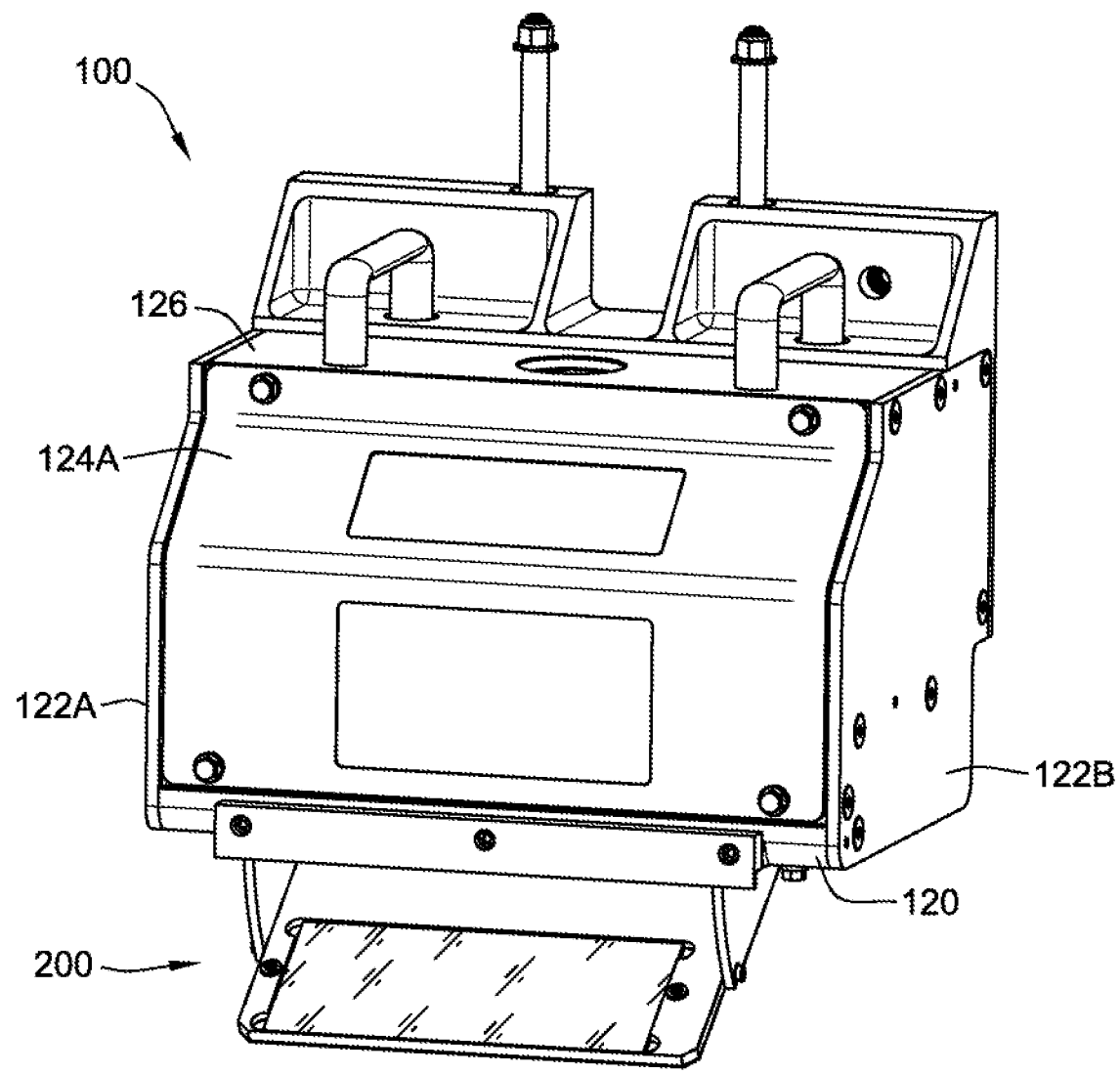
FIG. 6A is a front perspective view of the housing with the reflecting assembly in the deployed position, according to aspects of the present disclosure.
Figure 6B:
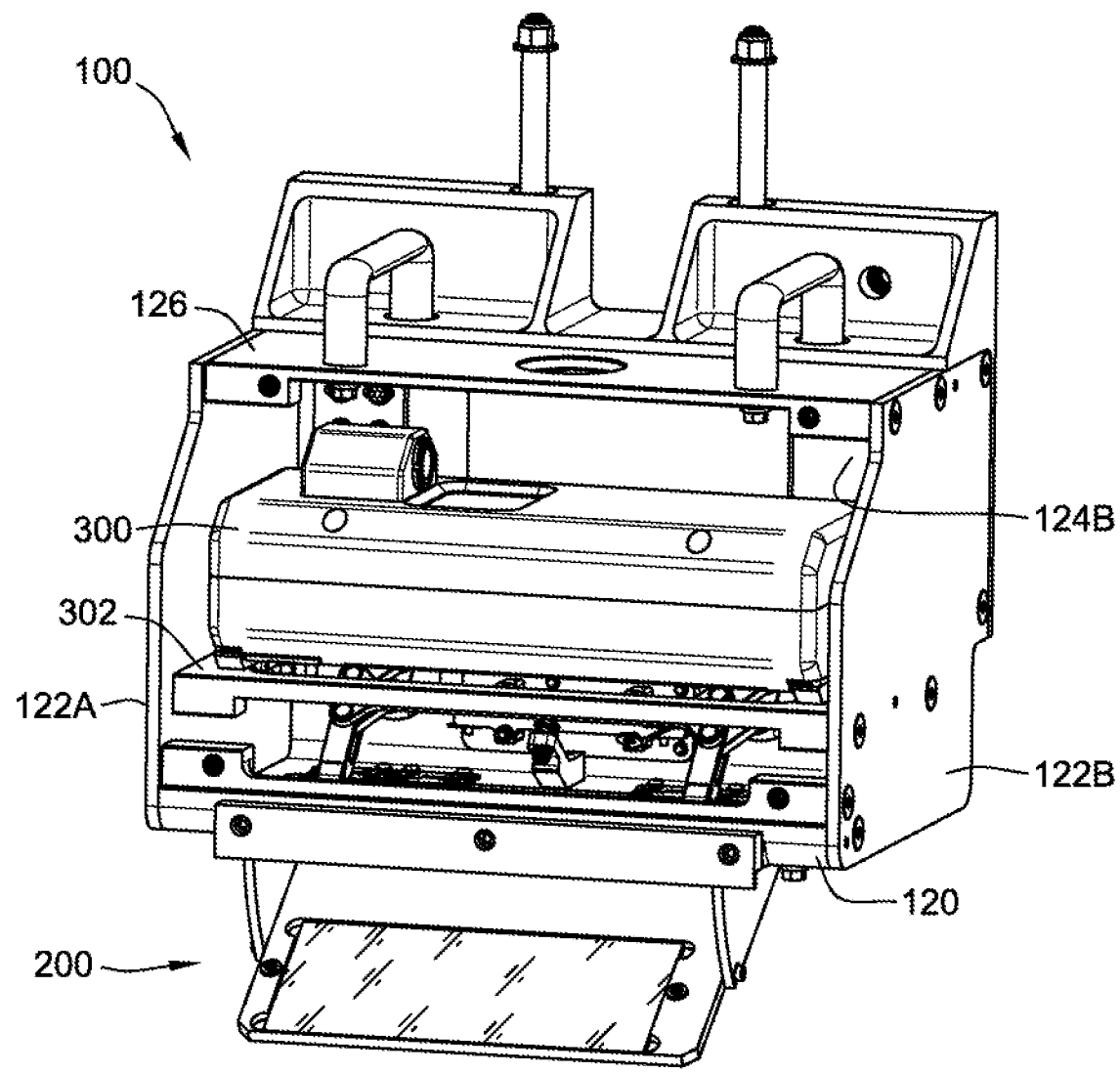
FIG. 6B is a front perspective view of the housing with the reflecting assembly in the deployed position and with an end wall of the housing removed to show an optical measurement system position within the housing, according to aspects of the present disclosure.

FIGS. 6A and 6B show external and internal views of the housing 100 when the reflecting assembly 200 is in the deployed position. The housing generally includes a base 120, two opposing sidewalls 122A and 122B, two opposing end walls 124A and 124B, and a lid 126. As can be seen in FIG. 6B, the optical measurement system 300 is mounted within the housing on a shelf 302 that can be secured within the interior of the housing 100. The reflecting assembly 200 includes a reflective element 204 that is generally disposed at a non-zero angle relative to the base 120 of the housing 100 when the reflecting assembly is in the deployed position. The reflective element 204 is configured to reflect electromagnetic radiation that is incident thereon.

Figure 7:
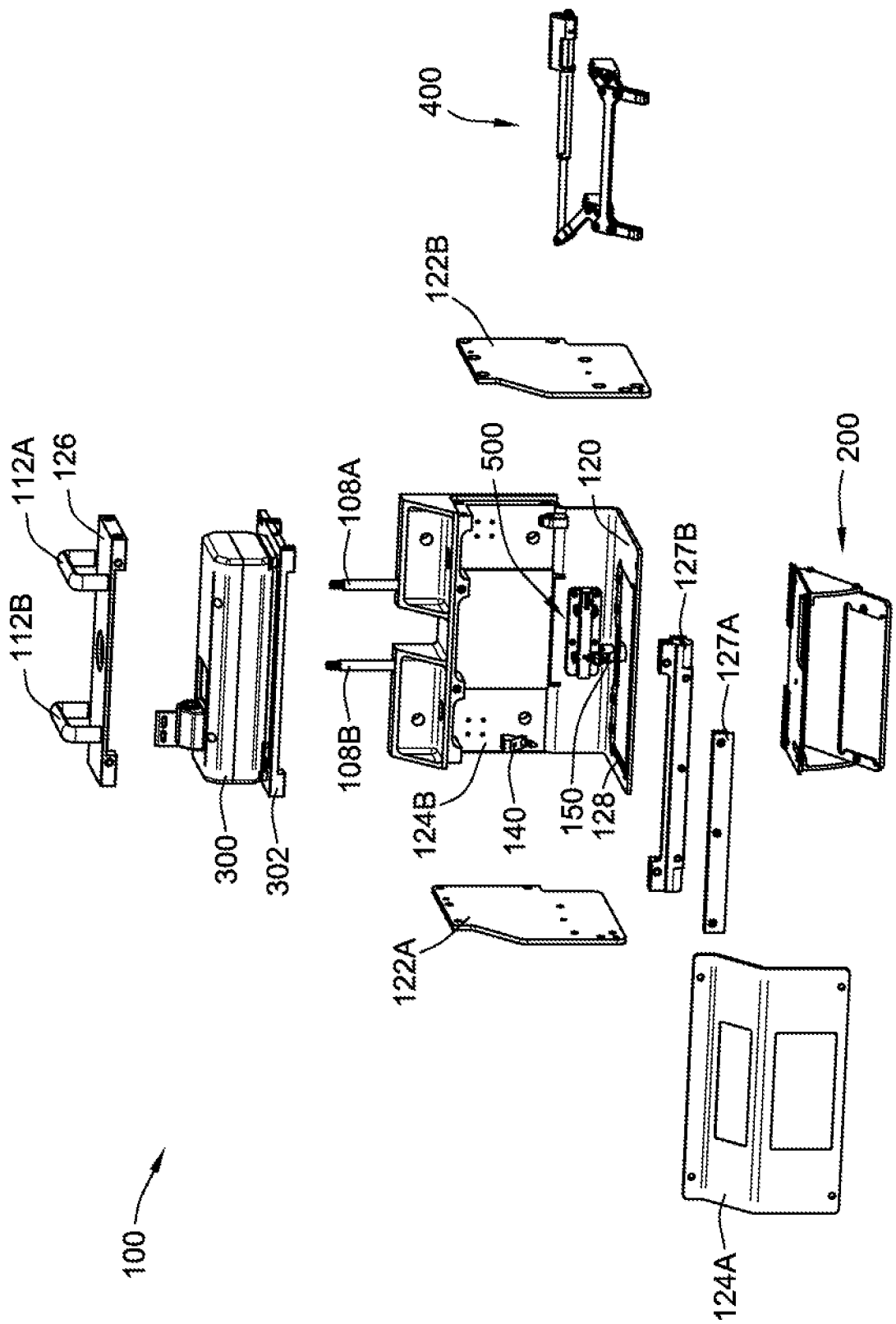
FIG. 7 is an exploded perspective view of the housing, according to aspects of the present disclosure.

FIG. 7 shows an exploded view of the housing 100, including the base 120, the sidewalls 122A and 122B, the end walls 124A and 124B, and the lid 126. The housing 100 also includes frame pieces 127A and 127B. Frame piece 127B is coupled to the base 120 and the end wall 124A to form a corner of the housing 100. Frame piece 127A is coupled to the front of frame piece 127B and aids in shielding any portion of the reflecting assembly 200 that extends in front of the housing 100 when the reflecting assembly 200 is in the stored position (see FIGS. 14A-14C). This helps to prevent debris from accumulating on the overhanging portion of the reflecting assembly 200 and keep the reflecting assembly 200 clean and free from damage.

As can be seen in FIG. 7, the base 120 of the housing 100 defines an opening 128. The reflecting assembly 200 can be pivotably coupled to the base 120 of the housing 100 such that the reflecting assembly 200 pivots or rotates between the stored and deployed positions and generally always occupies the opening 128. In other implementations however, the reflecting assembly 200 may be coupled to the housing 100 in various other manners that allow the reflecting assembly 200 to move in a different fashion between the stored and deployed positions. The components of the optical measurement system 300 (such as the electromagnetic radiation source and the optical sensor) can generally emit and receive electromagnetic radiation through one or more openings defined in the reflecting assembly 200.

In addition to the optical measurement system 300, a movement assembly that includes a deployment assembly 400 and a retraction assembly 500 is disposed within the housing 100. The retraction assembly 500 is generally coupled between the housing 100 and the reflecting assembly 200 and imparts a retraction force on the reflecting assembly 200. This retraction force biases the reflecting assembly 200 toward the reflecting assembly 200's stored position. The deployment assembly 400 is also coupled between the housing 100 and the reflecting assembly 200. The deployment assembly 400 includes an actuator and is configured to exert a deployment force on the reflecting assembly 200. This deployment force is generally sufficient to overcome the retraction force and cause the reflecting assembly 200 to move from its stored position to its deployed position.

The housing 100 also includes a retraction sensor 150 and a deployment sensor 140. The retraction sensor 150 is configured to sense when the reflecting assembly 200 has been moved all the way to its stored position. The retraction sensor 150 can generate a signal that is communicated to a user or a processing device that indicates that the reflecting assembly 200 has been moved to its stored position. The deployment sensor 140 is generally configured to sense when the reflecting assembly 200 has been moved all the way to its stored position, and can also generate a signal that is sent to a user or a processing device that indicates that the reflecting assembly 200 has been moved to its deployed position. Any type of sensor can be used for either the deployment sensor 140 or the retraction sensor 150, such as a mechanical sensor, an electrical sensor, an optical sensor, a limit switch (e.g., a plunger-type limit switch), or any combination thereof.

In other implementations, the deployment assembly 400 includes an internal sensor that is internal to the actuator, instead of or in addition to the external deployment sensor 140 and/or the retraction sensor 140. This internal sensor can sense when the actuator has been moved an appropriate amount to move the reflecting assembly 200 to the deployed assembly, and when the actuator has moved an appropriate amount to move the reflecting assembly 200 to the stored position. This internal sensor can help control and detect movements of the actuator, which assists in minimizing points of failure of the system.

Figure 8A:
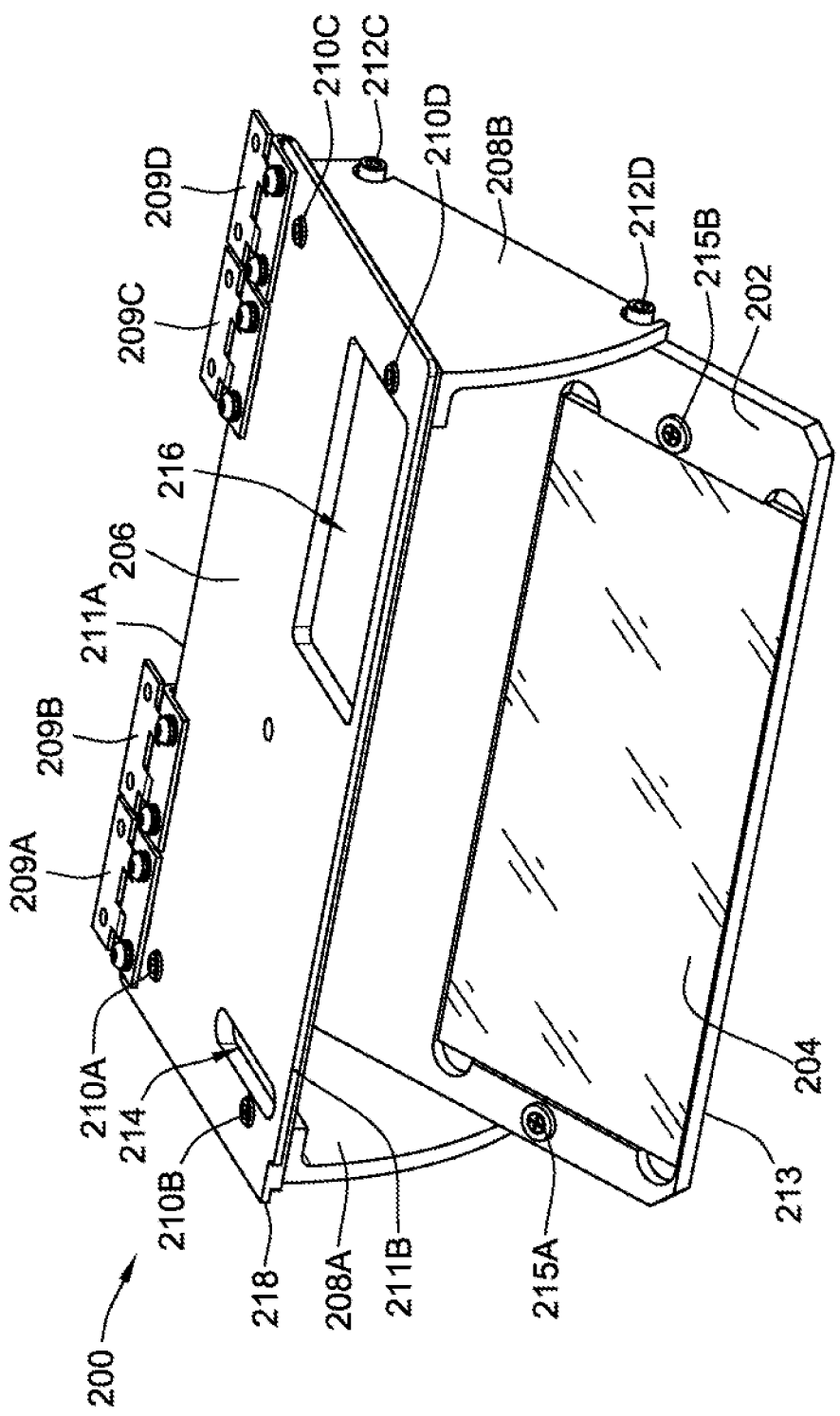
FIG. 8A is a perspective view of the reflecting assembly, according to aspects of the present disclosure.
Figure 8B:
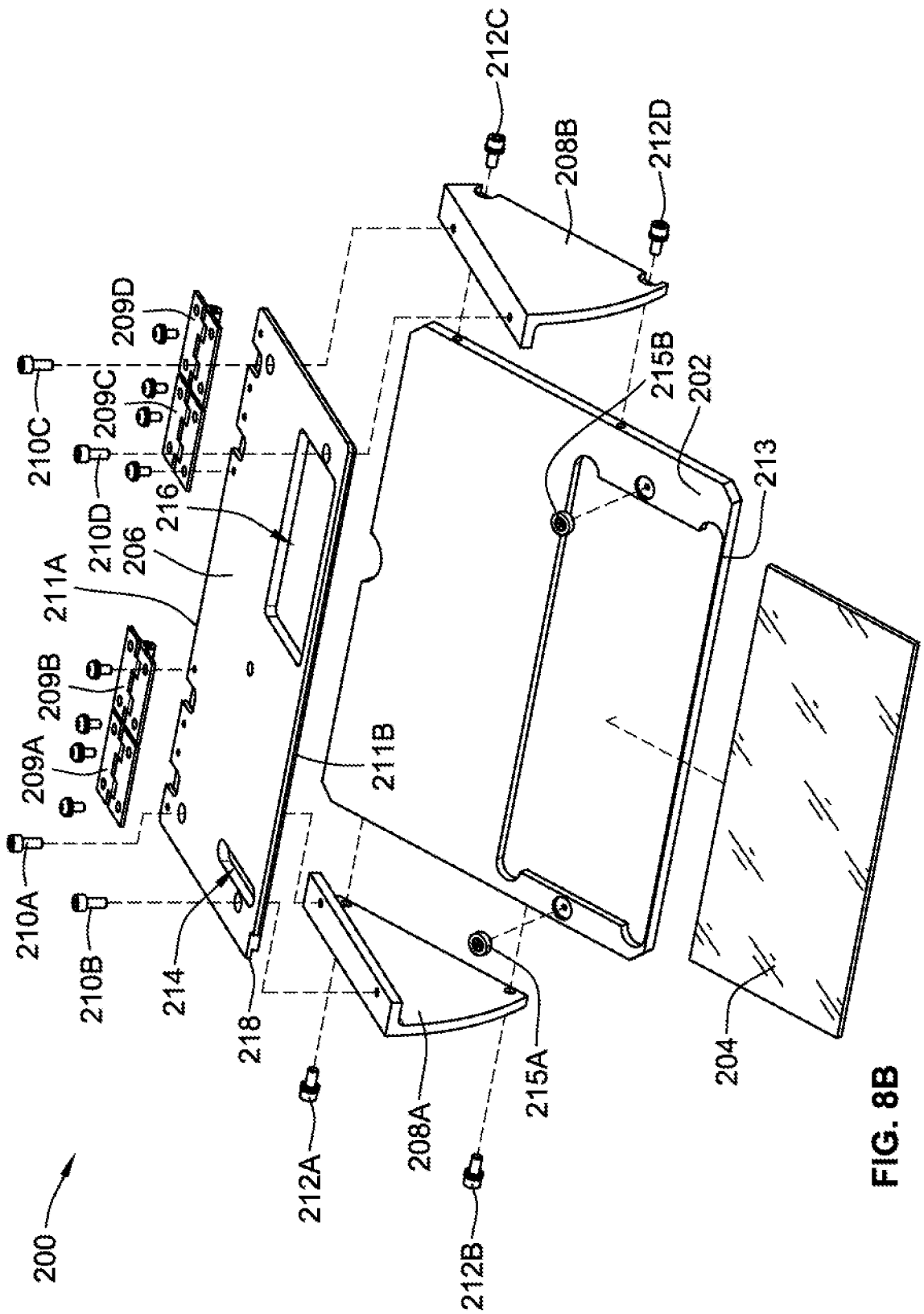
FIG. 8B is an exploded perspective view of the reflecting assembly, according to aspects of the present disclosure.

FIGS. 8A and 8B show perspective and exploded views of the reflecting assembly 200, respectively. The reflecting assembly 200 includes the baseplate 202, the reflective element 204 coupled to the base plate, and an aperture plate 206. The reflective element 204 can be a mirror that is coupled or otherwise secured to the baseplate 202. The reflective element 204 can also be any type of component suitable to reflect incoming and outgoing electromagnetic radiation. The reflective element 204 can be secured to the baseplate 202 using any suitable means, such as adhesive (for example mirror adhesive), tape, pins, clips, bolts, etc. In other implementations, the reflective element 204 is integrally formed with the baseplate 202.

The aperture plate 206 is coupled to the baseplate 202 via a first side bracket 208A and a second side bracket 208B. Hinges 209A-209D are coupled to the aperture plate 206. The hinges 209A-209D are used to attach one edge 211A of the aperture plate 206 to the base 120 of the housing 100. The opposite edge 211B of the aperture plate 206 is generally free to rotate or otherwise move along a circular path within the housing 100.

The reflecting assembly 200 may also include magnets 215A and 215B coupled to the baseplate 202 outside of the reflective element 204. The magnets 215A and 215B can be used to help retain the reflecting assembly 200 in the stored position. Due to vibration and shock as the vehicle travels along the running rails, the reflecting assembly 200 can accidentally rotate towards the deployed position. If this occurs, the reflective element 204 can be exposed to the environment at a time when the operator does not wish for this to happen.

In some implementations, the magnets 215A and 215B can be magnetically attracted to corresponding magnets attached to the underside of the housing. In other implementations, some or all of the underside of the housing may be formed from a magnetic material that attracts the magnets 215A and 215B. This magnetic attraction can assist in maintaining the reflecting assembly 200 in the stored position and in protecting the reflective element 204. In some implementations, mechanisms other than magnets can be used to assist in maintain the reflecting assembly 200 in its closed position. In any of these implementations, the deployment force imparted by the deployment assembly must be greater than both the retraction force and any additional force provided by magnets 215A and 215B or other means.

As is discussed in more detail herein, when the reflecting assembly 200 is in its stored position, the freely-rotating edge 211B of the aperture plate 206 is positioned within the housing 100 and is spaced upwards from the base 120 of the housing 100. When the reflecting assembly 200 is in its deployed position, the aperture plate 206 is disposed substantially flush with the base 120 of the housing 100. A corresponding freely-rotating edge 213 of the baseplate 202 of the reflecting assembly 200 also moves in a circular path when the reflecting assembly 200 moves between its stored and deployed positions. However, the baseplate 202 is disposed substantially flush with the base 120 of the housing (or disposed slightly beneath the base 120) when the reflecting assembly 200 is in the stored position, rather than the deployed position. The freely-rotating edge 213 of the baseplate 202 is spaced beneath the base 120 of the housing when the reflecting assembly is in the deployed position.

The aperture plate 206 defines a first aperture 214 and a second aperture 216. The first aperture 214 is generally located underneath the electromagnetic radiation source of the optical measurement system, while the second aperture 216 is generally located underneath the optical sensor of the optical measurement system. Thus, the electromagnetic radiation source emits electromagnetic radiation through the first aperture 214, while the optical sensor receives electromagnetic radiation through the second aperture 216. The electromagnetic radiation emitted by the electromagnetic radiation source through the first aperture 214 reflects off of the reflective element 204 toward the rail that is being analyzed. Similarly, the electromagnetic radiation that is received by the optical sensor through the second aperture 216 reflects off of the reflective element 204 and through the second aperture 216.

The aperture plate 206 has a flange 218 formed about the periphery of the aperture plate 206. The flange 218 of the aperture plate 206 is configured to engage the corresponding lip 121 (see FIGS. 14A-14C) that is formed about the periphery of the opening 128 in the base 120 of the housing 100. This engagement between the flange 218 and the lip 121 generally occurs when the reflecting assembly 200 is moved to its deployed position, An upper end of the first side bracket 208A is attached to the aperture plate 206 via first fasteners 210A and 210B. Similarly, an upper end of the second side bracket 208B is attached to the aperture plate 206 via first fasteners 210C and 210D. A lower end of the first side bracket 208A is attached to the baseplate 202 via second fasteners 212A and 212B, while a lower end of the second side bracket 208B is attached to the baseplate 202 via second fasteners 212C and 212D.

All of the first fasteners 210A-210D that connect the side brackets 208A, 208B to the aperture plate 206 are generally of the same kind. These first fasteners 210A-210D are configured to shear, detach, or otherwise break away in response to a sufficient force being imparted on any of the baseplate 202, the first side bracket 208A, or the second side bracket 208B. Generally, any force that is greater than a first detachment threshold force will cause the first and/or second side brackets 208A, 208B to detach from the aperture plate 206. Thus, if any debris or other foreign objects that may be present near the vehicle strike the baseplate 202 or the side brackets 208A, 208B (e.g., portions of the reflecting assembly 200 extending beyond the clearance envelope), most of the reflecting assembly 200 can simply break away from the housing 100. This prevents the housing 100 or the vehicle from sustaining any significant amounts of damage.

Similarly, all of the second fasteners 212A-212D are configured to shear, detach, or otherwise break away in response to a sufficient force being imparted to the baseplate 202. Any force that is greater than a second detachment threshold force will cause the baseplate 202 to break away from the side brackets 208A, 208B. The presence of fasteners with two different detachment thresholds allows the reflecting assembly 200 and/or the housing 100 to withstand different amounts of damage. For example, an object that contacts only the baseplate 202 can cause the baseplate 202 to detach from the side brackets 208A, 208B. However, if detachment of the baseplate 202 is sufficient to absorb the force of the impact to prevent damage to the housing 100 or the vehicle, it is desirable to prevent that same impact from detaching the side brackets 208A, 208B. Thus, by using first fasteners 210A-210D and second fasteners 212A-212D with different detachment thresholds, it is possible to have the reflecting assembly 200 break away in stages if necessary. In some implementations, the first fasteners 210A-210D and second fasteners 212A-212D can be break-away bolts that have a weakened portion on the shaft that is configured to shear, detach, or otherwise break-away in response to a sufficient force.

The first fasteners 210A-210D and second fasteners 212A-212D must also be able to hold the weight of the reflecting assembly and an additional force imparted due to movement of the vehicle along the railroad track. Thus, one or both of the first and second detachment threshold forces generally have a minimum value such that no portion of the reflecting assembly 200 breaks away from the housing 100 in response to normal operation of the system 100 and in the absence of any impacts from debris or other foreign objects. In some implementations, this minimum value can be between about 10 and 100 pounds of force, between about 20 and 70 pounds of force, or between about 30 and 50 pounds of force. In still other implementations, one or both of the first and second detachment thresholds are determined as a multiple of the weight of the reflecting assembly. In these implementations, one or both of the first and second detachment threshold forces are about two times the weight of the reflecting assembly, about three times the weight of the reflecting assembly, about five times the weight of the reflecting assembly, about ten times the weight of the reflecting assembly, or about twenty times the weight of the reflecting assembly.

To assist in this breakaway feature, the baseplate 202 and the side brackets 208A, 208B can be formed of a less rigid and more flexible material, such as plastic. This allows the baseplate 202 and the side brackets 208A, 208B to more easily absorb the force of impacts with debris or other foreign objects.

Figure 9A:
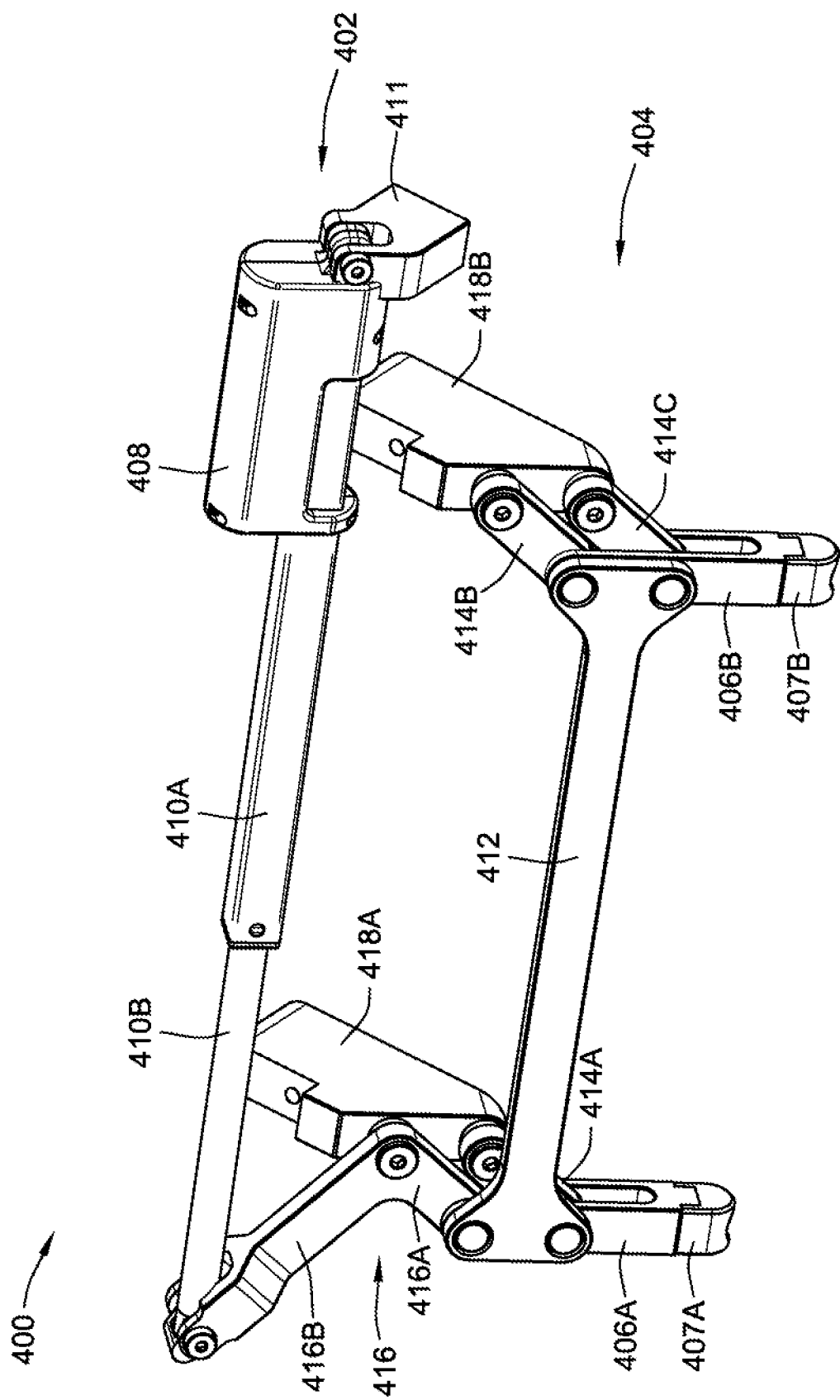
FIG. 9A is a perspective view of a deployment assembly for moving the reflecting assembly to the deployed position, according to aspects of the present disclosure.
Figure 9B:
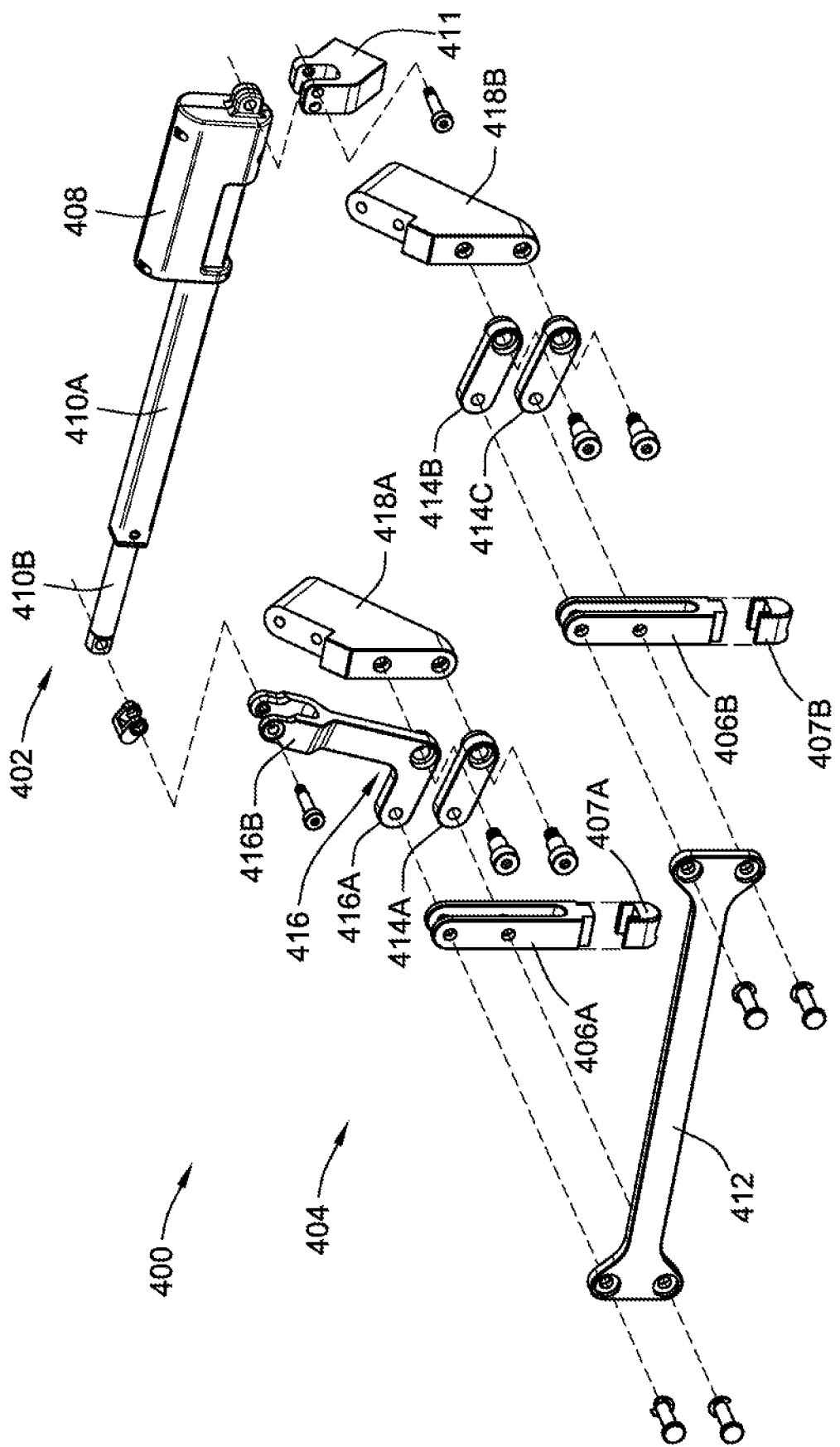
FIG. 9B is an exploded perspective view of the deployment assembly for moving the reflecting assembly to the deployed position, according to aspects of the present disclosure.

Referring now to FIGS. 9A and 9B, the deployment assembly 400 includes an actuator 402 and one or more mechanical linkages 404. The actuator 402 can be any suitable type of actuator, such as an electrically-driven actuator, a hydraulically-driven actuator, or a pneumatically-driven actuator. The actuator 402 can be a rotary or a linear actuator, or a servomotor. The mechanical linkages 404 couple the actuator 402 to fingers 406A and 406B. The fingers 406A and 406B have tips 407A and 407B that may be made of a material suitable to decrease the chances of damaging the aperture plate, such as rubber or felt. In the implementation illustrated in FIGS. 9A and 9B, the actuator 404 generally includes a motor 408 and telescopic portions 410A and 410B. The motor 408 is coupled to an actuator mount 411, which in turn is coupled to the housing to thereby mount the actuator 402. The fingers 406A and 406B are each coupled to a cross beam 412. Finger 406A is further connected to rotating link 414A, as well as a first portion 416A of an L-shaped pivoting bracket 416. Finger 406B is further connected to rotating links 414B and 414C.

The end of rotating link 414A opposite the connection to the finger 406A is coupled to a mounting bracket 418A. The bend of the L-shaped pivoting bracket 416 is also coupled to the mounting bracket 418A. Similarly, the ends of rotating links 414B and 414C opposite their connections to finger 404B are coupled to a mounting bracket 418B. Mounting brackets 418A and 418B are generally coupled to the housing to thereby mount the mechanical linkage 404. Finally, a second portion 416B of the L-shaped pivoting bracket 416 is coupled to the distal end of telescopic portion 410B. All of these components are generally rotatably coupled to each other using a variety of fasteners.

During operation, the actuator 402 is configured to retract and extend the telescopic portions 410A and 410B. Because telescopic portion 410B is coupled to the second portion 416B of the pivoting bracket 416, this movement causes the pivoting bracket 416 to pivot about its connection to the mounting bracket 418A. This pivoting motion causes the first portion 416A and rotating link 414A to also pivot, which in turn moves finger 406A. Because finger 406B is coupled to finger 406A via the cross beam 412, this pivoting motion generally moves finger 406B in lockstep motion with finger 406A.

The fingers 406A and 406B generally move in a sweeping motion responsive to movement of the actuator 402 between a first position and a second position. In the first position, the fingers 406A and 406B are moved up and away from the aperture plate 206, and thus generally impart zero force on the aperture plate 206. This allows the retraction assembly to move the reflecting assembly 200 to the stored position. In some implementations, the fingers 406A and 406B may impart a non-zero force on the aperture plate 206 when in the first position, so long as this non-zero force is less than the retraction force imparted on the reflecting assembly 200 by the retraction assembly 500. In the second position, the fingers 406A and 406B extend down and out toward the aperture plate 206. The fingers 406A and 406B thus impart a deployment force to the aperture plate 206. This deployment force is generally larger than the retraction force imparted on the aperture plate 206 by the retraction assembly, thus causing the reflecting assembly 200 to move to its deployed position.

In other implementations, the actuator 402 of the deployment assembly 400 itself directly moves the reflecting assembly 200 between the stored position and the deployed position, instead of or in addition to the mechanical linkages 404.

Figure 10A:
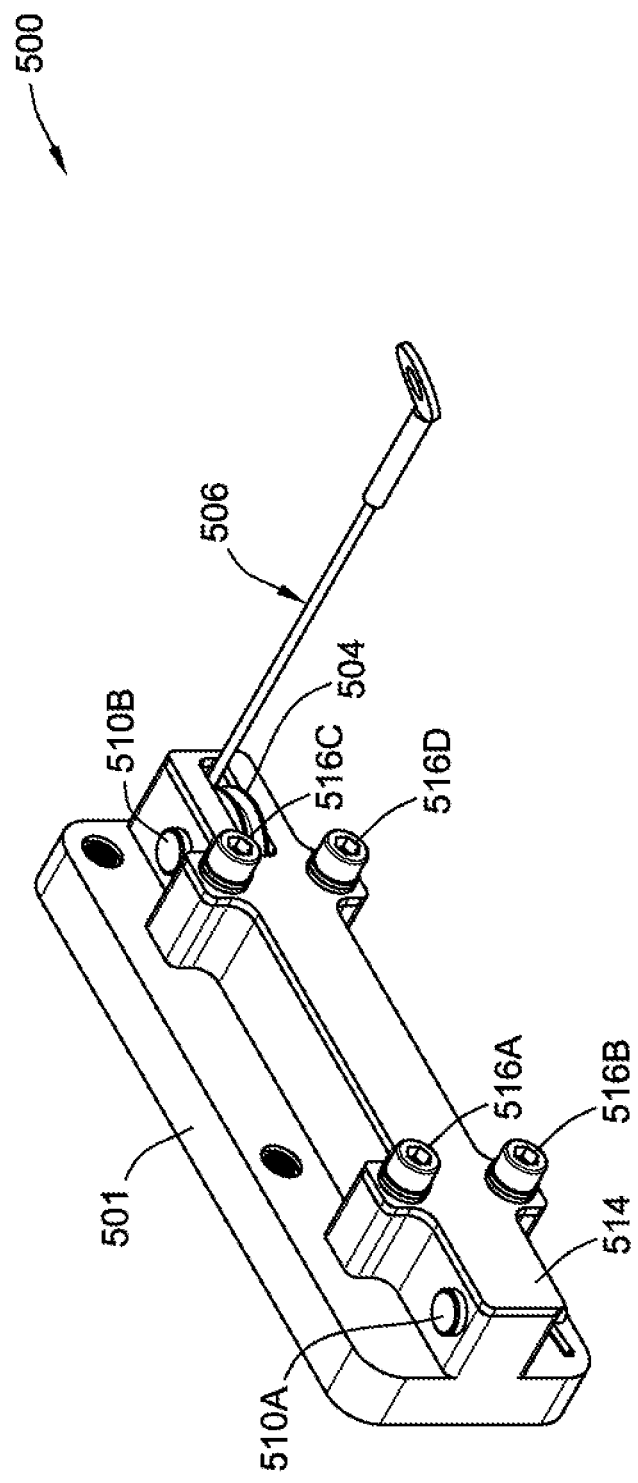
FIG. 10A is a perspective view of a retraction assembly for moving the reflecting assembly to the stored position, according to aspects of the present disclosure.
Figure 10B:
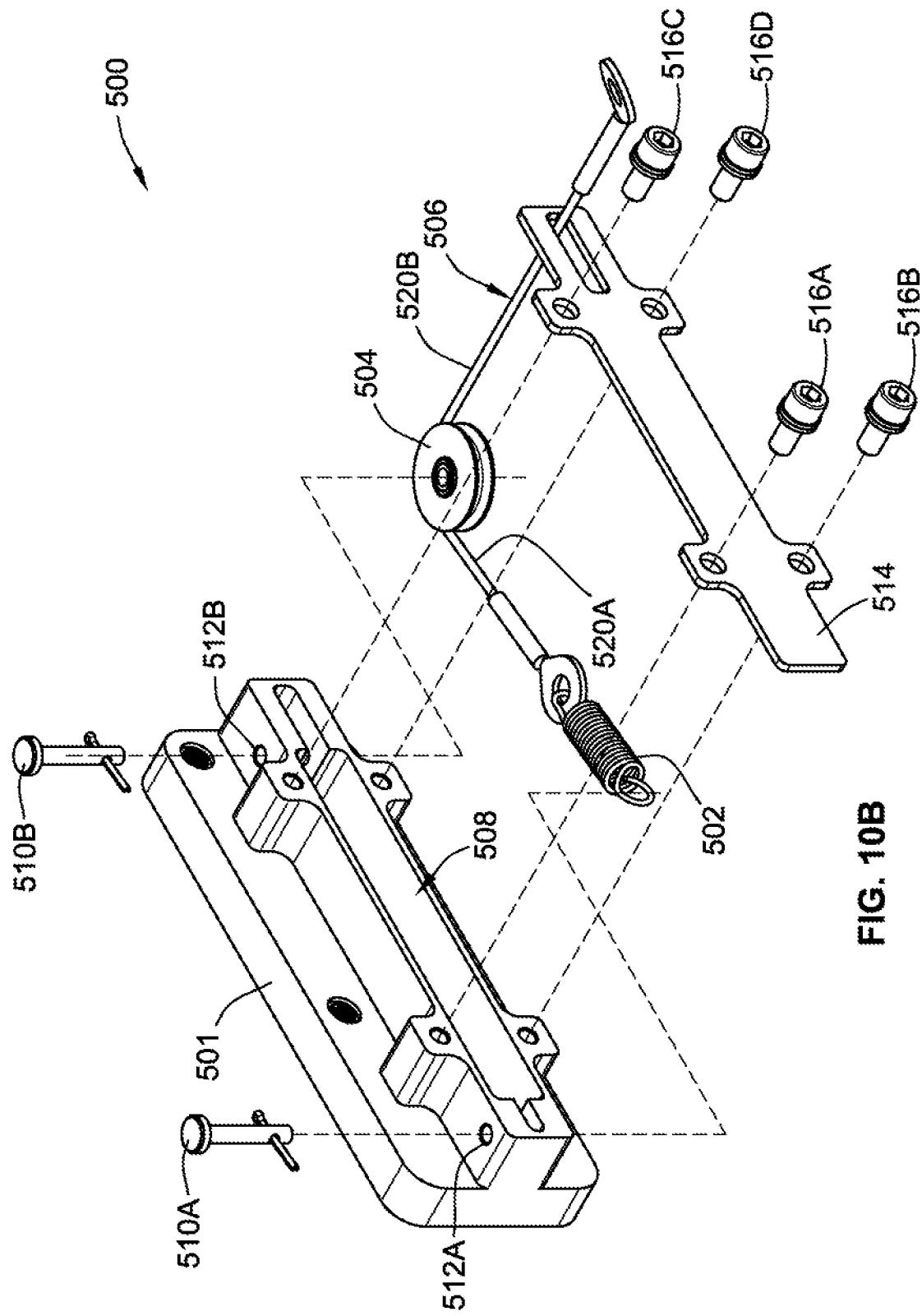
FIG. 10B is an exploded perspective view of the retraction assembly for moving the reflecting assembly to the stored position, according to aspects of the present disclosure.

Referring now to FIGS. 10A and 10B, the retraction assembly 500 includes a retraction assembly housing 501, a spring 502, a pulley 504, and a cable 506. A first end of the cable 506 is coupled to the aperture plate of the reflecting assembly during operation, while a second end is coupled to one end of the spring 502. The opposite end of the spring 502 is secured to the retraction assembly housing 501. During operation, the spring 502, the pulley 504, and a first portion 520A of the cable 506 between the spring 502 and the pulley 504 are disposed within a channel 508 defined by the retraction assembly housing 501. A first mounting post 510A is inserted through a reflecting assembly housing aperture 512A and couples to the spring 502 to thereby secure the spring 502 within the channel 508. A second mounting post 510B is inserted through a reflecting assembly housing aperture 512B and through the pulley 504 to thereby secure the pulley 504 within the channel 508. A cover plate 514 is secured to the reflecting assembly housing 501 via fasteners 516A-516D. A second portion 520B of the cable 506 extends out of the reflecting assembly housing 501 through a cover plate aperture 518, and is secured to the aperture plate.

During operation, the spring 502 imparts a retraction force on the reflecting assembly via the cable 506. This retraction force biases the reflecting assembly 200 to the stored position, where the aperture plate 206 is rotated up into the housing 100 and the baseplate 202 is generally flush or level with the base 120 of the housing 100. As is shown in FIG. 10B, the spring 502 is disposed at an angle relative to the second portion 520B. In the illustrated implementation, this angle is about 90°. In other implementations however, this angle can have other values. For example, in some implementations the cable 506 may be attached directly to the spring 502, and thus the angle could be about 45° or about 0°.

Other implementations of the retraction assembly 500 can be used that utilize other methods or mechanisms for imparting the retraction force on the reflecting assembly 200. For example, the retraction assembly could include various actuators that either attach directly to the aperture plate 206, that replace the spring 502 and couple to the cable 504, or are coupled to the reflecting assembly 200 in other ways. This actuator could be electrically driven, hydraulically driven, pneumatically driven, or driven any other type of way. In other implementations, the retraction assembly 500 does not utilize the spring 502. Instead the cable 506 that is utilized is configured as a flexible cable with a spring constant, and can be extended so that it couples to the first mounting post 510A. The spring constant of the flexible cable 506 thus urges the reflecting assembly 200 back to the stored position.

In some implementations of the system 10, the movement assembly does not contain physically separate components, groups of components, or sub-systems that only move the reflecting assembly to either the stored position or the deployed position. Instead, the movement assembly can contain a single component, group of components, or sub-system that is configured to move the reflecting assembly between the stored position and the deployed position, e.g., moves the reflecting assembly 200 from the stored position to the deployed position and from the deployed position to the stored position. The movement assembly can include an actuator that is configured to contact and move the reflecting assembly 200. This actuator can be any suitable type of actuator, such as an electrically-driven actuator, a hydraulically-driven actuator, or a pneumatically-driven actuator. The actuator can be a rotary or a linear actuator, or a servomotor. The system 10 may include one or more sensors 10 to detect when the reflecting assembly 200 is in the stored position and in the deployed position. The one or more sensors may be disposed within the housing 100 and external to the actuator, in case a portion of the actuator is configured to contact the sensor. The one or more sensors may also be positioned internal to the actuator and detect movement of the actuator, thereby detecting when the reflecting assembly 200 is in the stored position and the deployed position.

Referring now to FIGS. 11A-13B, the deployment assembly 400 and the retraction assembly 500 work in concert to move the reflecting assembly 200 between the stored position and the deployed position. FIG. 11A shows a side cross-sectional view of the housing 100 containing the optical measurement system 300 mounted on the shelf 302 therein, and with the reflecting assembly 200 in the deployed position. FIG. 11B shows a perspective view of the interior of the housing 100 with the optical measurement system 300 removed and the reflecting assembly 200 in the deployed position. In this position, the baseplate 202 has been rotated downwardly such that the baseplate 202 and the reflective element 204 coupled thereto extend beneath the housing 100 at an angle relative to the base 120 of the housing 100. The aperture plate 206 has been rotated downwardly such that it is substantially flush with the base 120 of the housing 100.

In the deployed position, the cable 506 of the retraction assembly stays attached to the aperture plate 206. The spring of the retraction assembly thus constantly applies the retraction force to the aperture plate 206, biasing the reflecting assembly 200 to its stored position. However, in the deployed position, the actuator 402 of the deployment assembly is fully extended, which causes the fingers 406A, 406B to extend toward the aperture plate 206 to their first position. The deployment force imparted on the aperture plate 206 by the fingers 406A, 406B is larger than the retraction force, thus causing the reflecting assembly 200 to move to its deployed position.

As can be seen in FIG. 11B, when the actuator 402 is fully extended, a distal end of the telescopic portion 410B of the actuator 402 contacts the deployment sensor 140. This deployment sensor 140 can be a touch or pressure sensor that senses the contact with the telescopic portion 410B. When the deployment sensor 140 senses contact with the telescopic portion 410B, this indicates that the telescopic portion 410B has been fully extended, and thus that the reflecting assembly is all the way in its deployed position. Moreover, the aperture plate 206 does not contact the retraction sensor 150 when reflecting assembly 200 is in the deployed position. The magnets 215A and 215B mounted in or coupled to the baseplate 202 of the reflecting assembly 200 are also shown. The magnets 215A and 215B are magnetically attracted to corresponding magnets 217A and 217B mounted in or coupled to the underside of the base 120 of the housing 100.

FIG. 12A shows a side cross-sectional view of the housing 100 containing the optical measurement system 300 mounted on the shelf 302 therein, and with the reflecting assembly 200 between the deployed position and the stored position. FIG. 12B shows a perspective view of the interior of the housing 100 with the optical measurement system 300 removed and the reflecting assembly 200 between the deployed position and the stored position. In this position, the baseplate 202 is rotated upwardly towards the base 120 of the housing 100. Similarly, the aperture plate 206 has been rotated upwardly away from the base 120 of the housing 100. Because the reflecting assembly 200 is no longer in the deployed position, the baseplate 202 and the aperture plate 206 are no longer in the proper positions to direct the electromagnetic radiation emitted by the electromagnetic source of the optical measurement system 300 towards the rail to be analyzed. Similarly, the optical sensor of the optical measurement system 300 cannot receive electromagnetic radiation reflected off of the rail to be analyzed.

As can be seen in FIG. 12B, the telescopic portion 410B has been retracted, causing the fingers 406A and 406B to move away from the first position. Thus, the fingers 406A and 406B no longer impart the deployment force onto the aperture plate 206. Because the cable 506 of the retraction assembly 400 is still connected to the aperture plate 206 and imparting the retraction force on the aperture plate 206, the reflecting assembly 200 is moved from the deployed position to the stored position. In the position shown in FIG. 12A and FIG. 12B, neither the deployment sensor 140 or the retraction sensor 150 are contacted by any component.

FIG. 13A shows a side cross-sectional view of the housing 100 containing the optical measurement system 300 mounted on the shelf 302 therein, and with the reflecting assembly 200 in the stored position. FIG. 13B shows a perspective view of the interior of the housing 100 with the optical measurement system 300 removed and the reflecting assembly 200 in the stored position. The actuator 402 has continued to retract, which causes the fingers 406A and 406B to continue to move away from the aperture plate 206. The retraction force imparted on the reflecting assembly 200 by the retraction assembly 500 thus causes the aperture plate 206 to continue rotating upwardly away from the base 120 of the housing 100. The baseplate 202 is similarly caused to continue rotating upwardly towards the base 120 of the housing 100.

The baseplate 202 of the reflecting assembly 200 is positioned generally parallel to the base 120 of the housing 100, either substantially flush with the base 120 of the housing 100 or just slightly beneath the base 120 of the housing 100. In the stored position, the reflecting assembly 200 cannot reflect electromagnetic radiation emitted by the electromagnetic radiation source of the optical measurement system 300 towards the rail, nor can the reflecting assembly 200 direct electromagnetic radiation reflected off of the rail towards the optical sensor of the optical measurement system 300. In this stored position, the aperture plate 206 contacts the retraction sensor 150, which can send a signal indicating that the reflecting assembly 200 has been fully retracted.

Figure 14B:
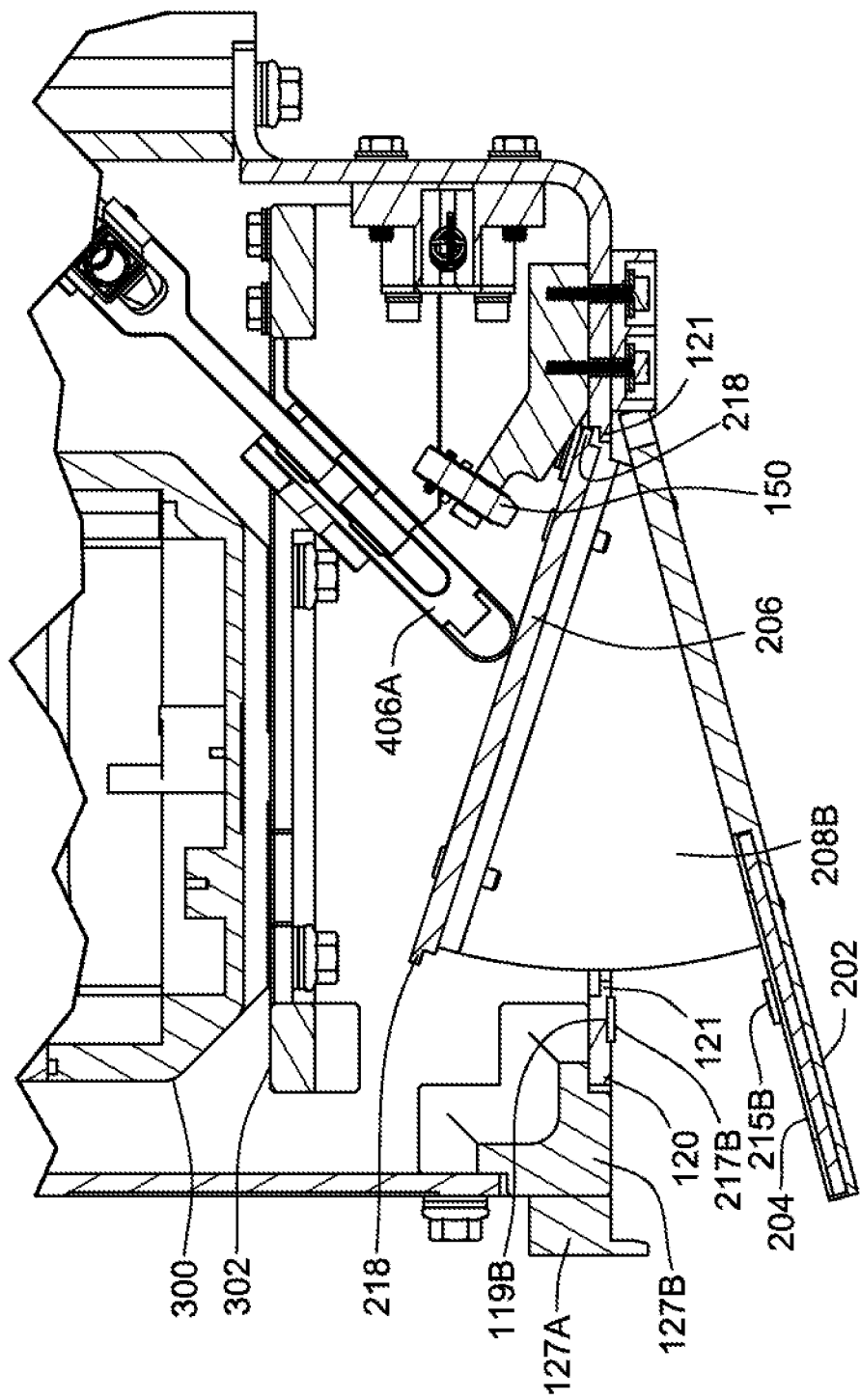
FIG. 14B is a zoomed-in cross-sectional view of the housing with the reflecting assembly between the deployed position and the stored position, taken along line 14B-14B of FIG. 12B, according to aspects of the present disclosure.
Figure 14C:
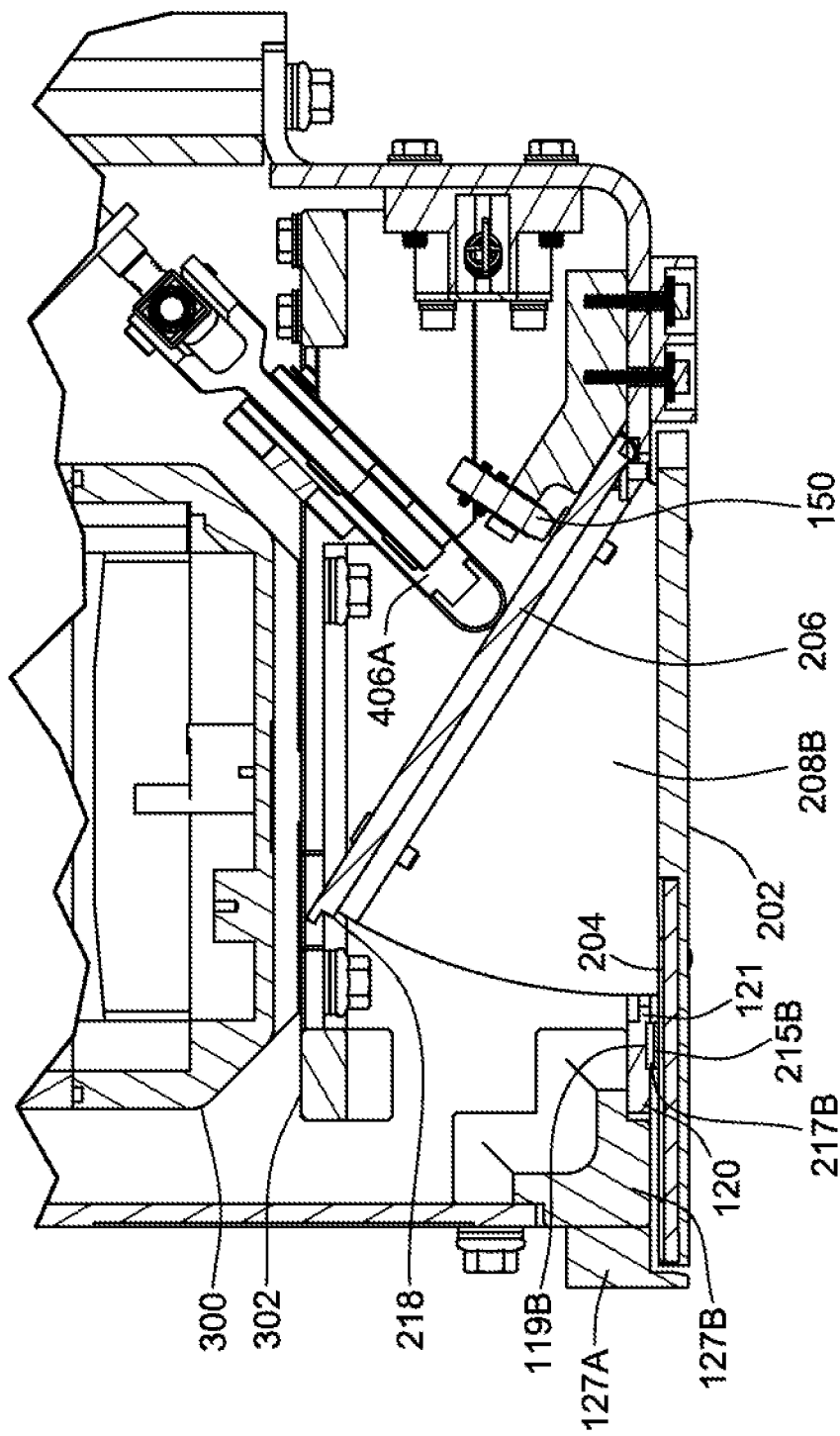
FIG. 14C is a zoomed-in cross-sectional view of the housing with the reflecting assembly in the stored position, taken along line 14C-14C of FIG. 13B, according to aspects of the present disclosure.

FIGS. 14A-14C show magnified cross-sectional views of the deployable measurement system along the section indicated in FIGS. 11B, 12B, and 13B, respectively. In FIG. 14A, the reflecting assembly 200 is in the deployed position. Thus, the baseplate 202 is extended downward beneath the base 120 of the housing, and the reflective element 204 is positioned at an angle relative to the base 120. The aperture plate 206 is rotated downward so that it is substantially flush with the base 120. As can be seen in FIG. 14A, the lip 121 formed around the periphery of the opening in the base 120 is configured to mate with the flange 218 that is formed around the periphery of the aperture plate 206. This prevents the aperture plate 206 from falling through the opening in the base 120 or from being forced through the opening in the base 120. Because the reflecting assembly is in the deployed position, the magnet 215B mounted in or coupled to the baseplate 202 of the reflecting assembly 200 is not magnetically attracted to magnet 217B that is mounted within a recess 119B that is formed in the base 120 of the housing.

As shown in FIGS. 14B and 14C, the aperture plate 206 and the baseplate 202 rotated upwardly as the fingers of the deployment assembly (including finger 406A) are retracted. Due to the retraction forced imparted on the aperture plate 206 by the retraction assembly, the aperture plate 206 moves upward with the finger 406A as the finger 406A is retracted. Once the fingers have been fully retracted, the aperture plate 206 contacts the retraction sensor 150, which can indicate to the user that the reflecting assembly is in the stored position. As shown in FIG. 14B, as the reflecting assembly 200 moves from the deployed position to the stored position, magnet 215B of the reflecting assembly 200 comes closer to magnet 217B of the base 120 of the housing. As shown in FIG. 14C, once the reflecting assembly 200 moves to the stored position, magnet 215B of the reflecting assembly 200 comes into contact with magnet 217B of the base 120 of the housing. The magnetic attraction between magnet 215B and 217B assists at least partially in maintaining the reflecting assembly 200 in the stored position. This magnetic attraction helps to prevent vibrations or shocks that may occur as the vehicle travels along the railroad track from moving the reflecting assembly 200 out of the stored position.

In other implementations, the reflecting assembly 200 does not move in a circular fashion between the stored and deployed positions, but instead in a generally vertical direction between the stored and deployed positions. In these implementations, the baseplate 202 and the reflective element 204 are disposed at a generally constant angle relative to the housing 100. This angle is suitable for analyzing the desired rail, and thus once the reflecting assembly 200 is lowered into the deployed position, the rail can be analyzed. In still other implementations, the reflecting assembly can move in both a circular direction and a generally vertical direction between the stored and deployed positions.

Figure 15A:
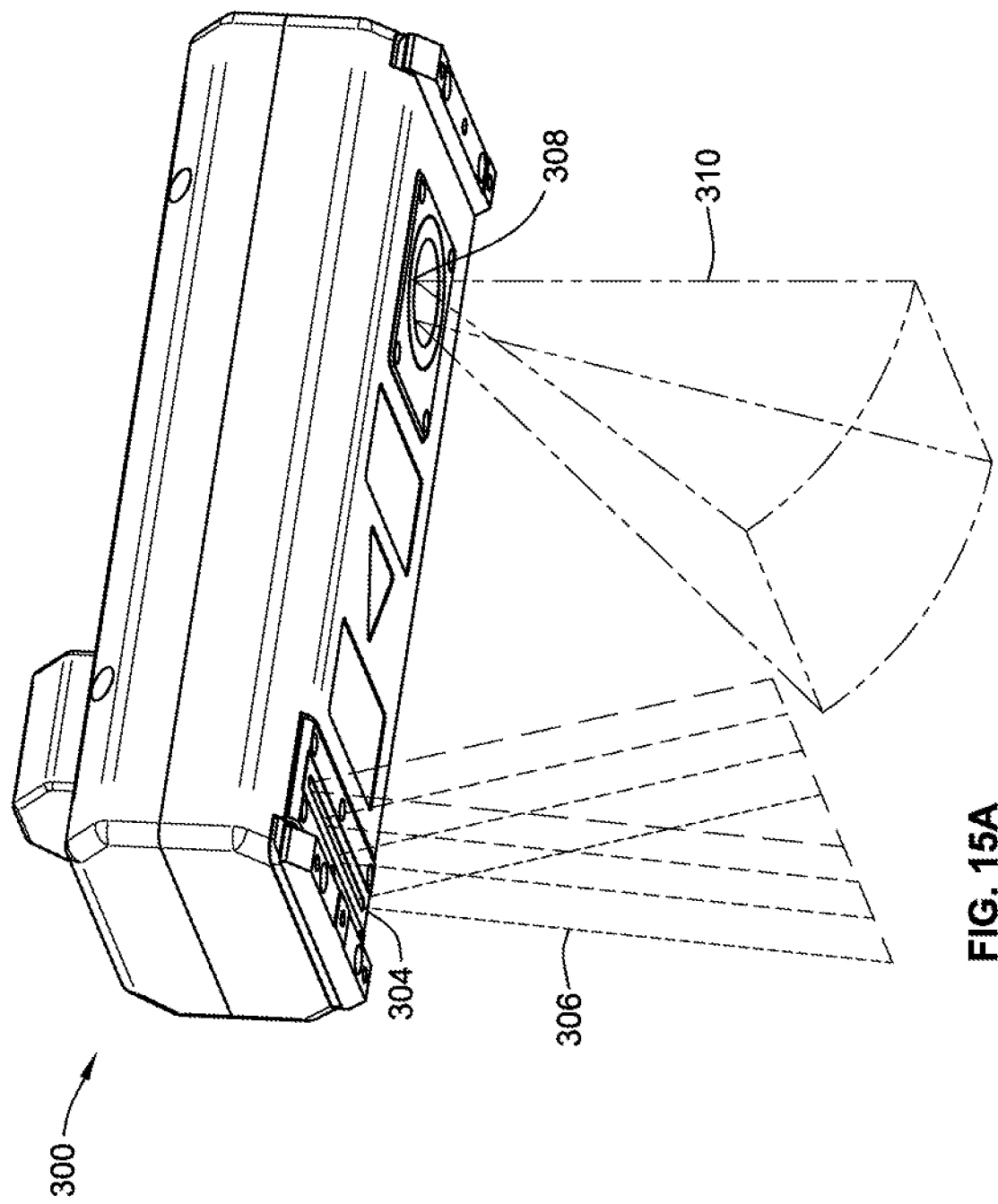
FIG. 15A is a perspective view of the optical measurement system, according to aspects of the present disclosure.
Figure 15C:
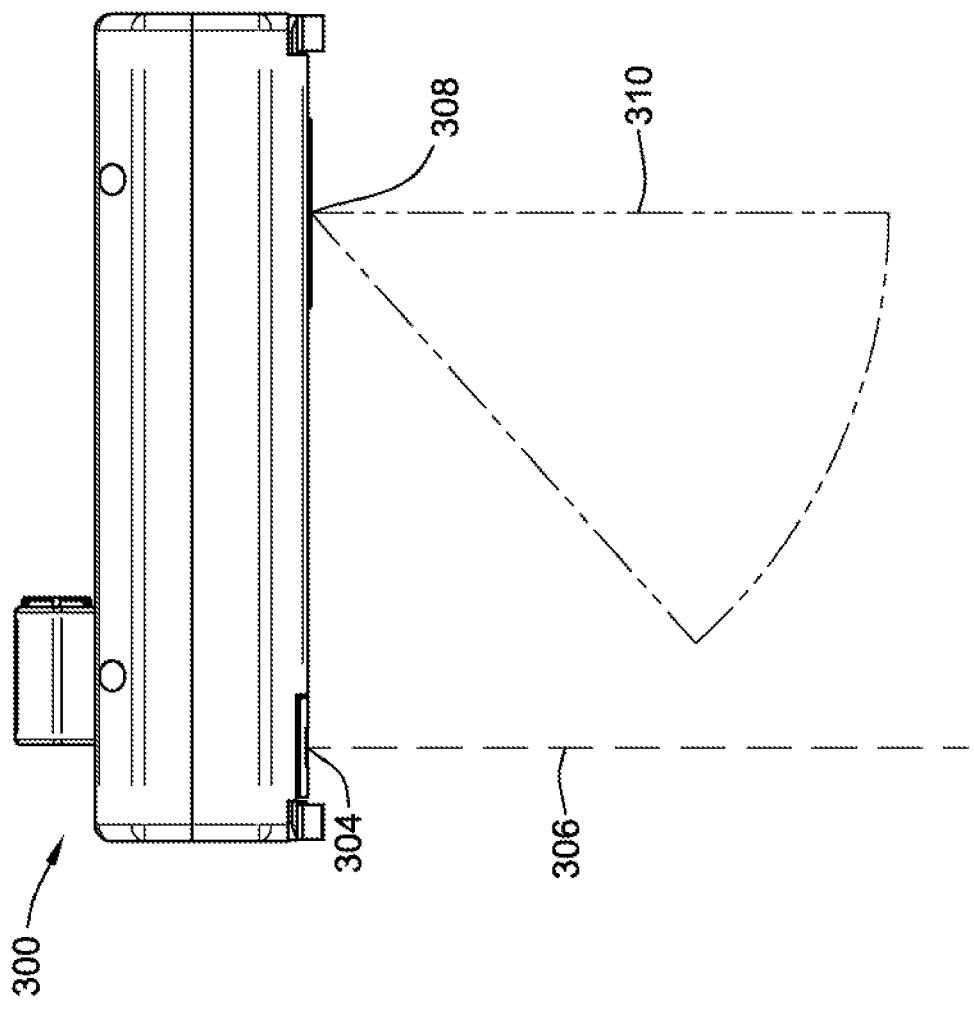
FIG. 15C is a side view of the optical measurement system of FIG. 15A, according to aspects of the present disclosure.
Figure 15B:
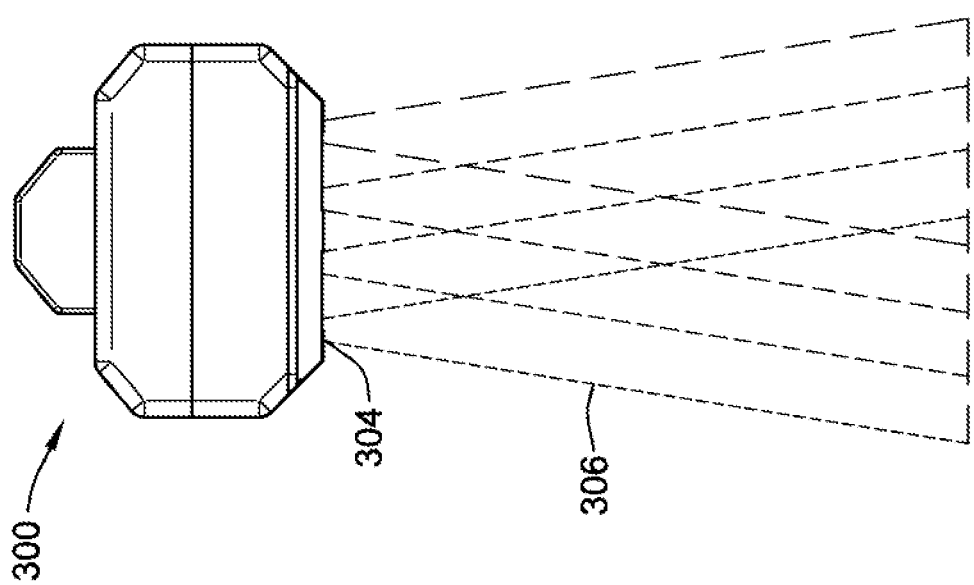
FIG. 15B is an end view of the optical measurement system of FIG. 15A, according to aspects of the present disclosure.

Referring now to FIGS. 15A-15C, the optical measurement system 300 generally includes at least one electromagnetic radiation source 304 and at least one optical sensor 308. The at least one electromagnetic radiation source 304 can be any suitable source, such as a laser, a light emitting diode (LED), incandescent light bulbs, fluorescent light bulbs, flash lamps, etc. The at least one electromagnetic radiation source 304 is configured to emit electromagnetic radiation that is then incident on the surface of the rail being analyzed. In some implementations, the optical measurement system 300 can include multiple electromagnetic radiation sources 304. This can be done to ensure sufficient spatial coverage of the surface of the rail to be analyzed, and/or to ensure that the resulting reflecting off of the surface of the rail is bright enough to be imaged by the optical sensor 308. As shown in FIGS. 15A and 15B, the electromagnetic radiation emitted by the at least one electromagnetic radiation source 304 has a broad emission area 306, and is not concentrated at any single point. This allows the emitted electromagnetic radiation to be incident on some or all of the height of the rail being analyzed, rather than just a single point on the rail.

Generally, the emission area 305 of the electromagnetic radiation source 304 points downward from the optical measurement system 300. Thus, when the reflecting assembly is in the stored position, the emission area of the electromagnetic radiation source 304 does not include the surface of the rail being analyzed. However, when the reflecting assembly is moved to the deployed position, the reflective element of the reflecting assembly causes the emission area 306 of the electromagnetic radiation source 304 to include the surface of the rail being analyzed.

Similar to the at least one electromagnetic radiation source 304, the optical sensor 308 can be any suitable sensor, such as a photodiode, a complementary metal-oxide-semiconductor (CMOS) sensor or sensor array, a charge-coupled device (CCD) sensor or array, a line scan camera, an area scan camera, a photomultiplier tube (PMT) array, etc. The optical sensor 308 is generally configured to received electromagnetic radiation that is reflected off of the surface of the rail being analyzed. Thus, in some implementations, the optical sensor 308 is a camera that captures an image of the surface of the rail as the surface of the rail is being illuminated by the at least one electromagnetic radiation source 304, e.g., the camera generates image data that is reproducible as an image of the surface of the rail. Similar to the electromagnetic radiation source 304, the optical sensor 308 can have a broad field of view 310 in order to view the necessary area on the surface of the rail.

Generally, the field of view 310 of the optical sensor 308 points downward from the optical measurement system 300. Thus, when the reflecting assembly is in the stored position, the field of view 310 of the optical sensor 308 does not include the surface of the rail being analyzed. However, when the reflecting assembly is moved to the deployed position, the reflective element of the reflecting assembly causes the field of view 310 of the optical sensor 308 to include the surface of the rail being analyzed.

Figure 16:
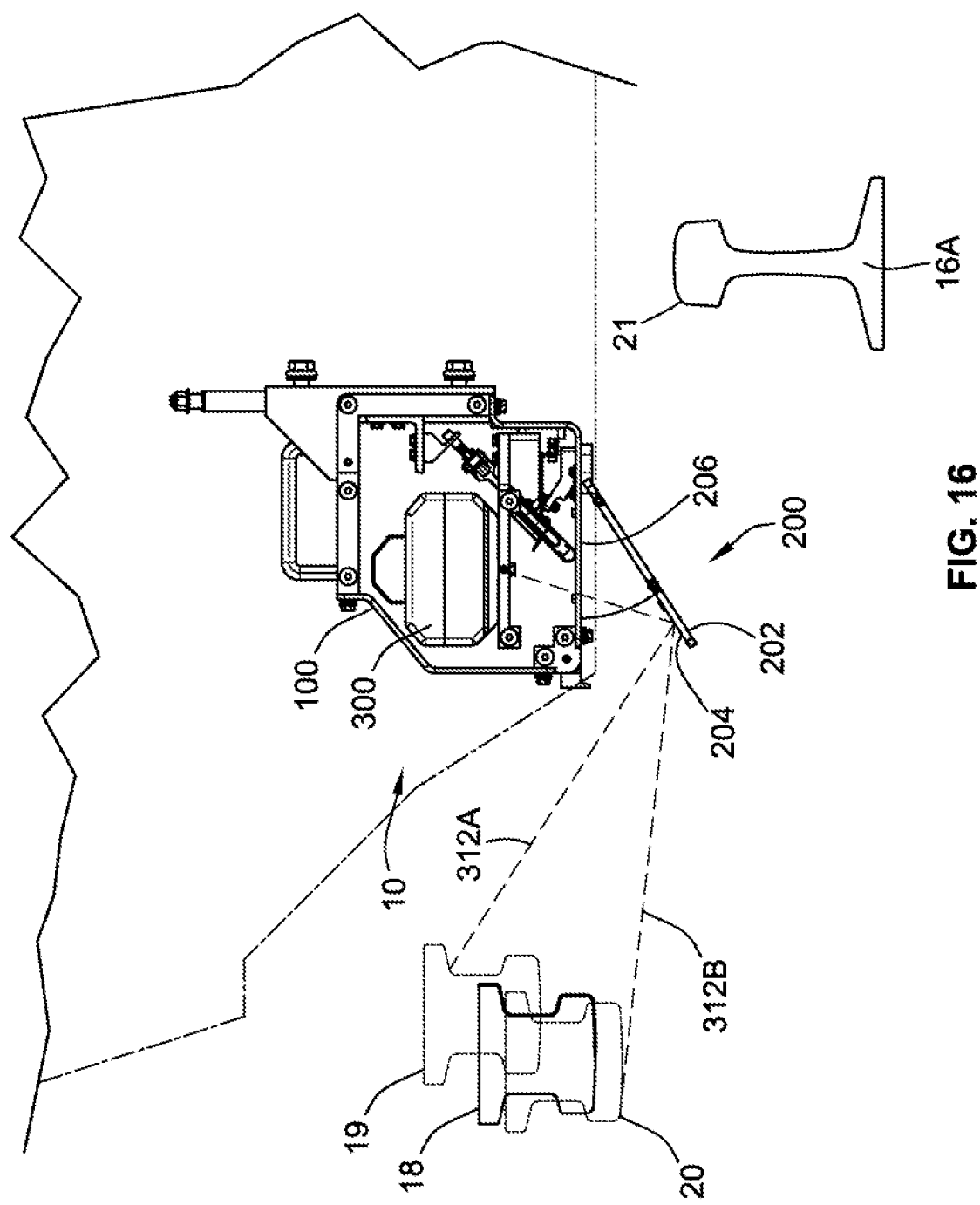
FIG. 16 is a cross-sectional view of the optical measurement system within the housing analyzing a rail when the reflecting assembly is in the deployed position, according to aspects of the present disclosure.

Referring now to FIG. 16, in order to analyze the surface of a rail 18 using the deployable measurement system 10, the reflecting assembly 200 must be moved to its deployed position. In the deployed position, the baseplate 202 extends below the housing 100 such that the reflective element 204 is positioned at an angle relative to the base of the housing 100. In some implementations, this angle can be between about 5° and about 60°, between about 10° and about 45°, between about 20° and about 40°, about 30°, or about 33°.

Generally, this angle is selected, along with the apertures in the aperture plate 206, such that the electromagnetic radiation source of the optical measurement system 300 is able to illuminate a desired area of the rail, and such that the optical sensor of the optical measurement system 300 is able to capture an image of the desired area of the rail.

FIG. 16 shows an implementation of system 10 wherein the rail 18 that is being analyzed is an inverted power-supplying rail. In this implementation, it is generally necessary to analyze the entire bottom surface of the rail 18, as well as some portion of the interior side surface of the rail 18. To that end, the angle at which the reflective element 202 is disposed at and the size of the apertures in the aperture plate 206 are chosen such that the emission area of the electromagnetic radiation sources and the field of view of the optical sensor are broad enough to analyze the entire bottom surface. This is shown in FIG. 16, where the reflecting assembly 200 and the optical measurement system 300 provide an emission area and field of view formed by upper boundary 312A and lower boundary 312B.

The upper boundary 312A is generally not placed at the highest location of the side surface of the rail 18 that is needed. Instead, the upper boundary 312A is selected so as to provide coverage for a hypothetical rail 19 that is positioned higher than the standard location of rail 18. Similarly, the lower boundary 312B is not selected so as to cover the entire bottom surface of the rail 18, but instead is selected so as to ensure that the entire lower surface of a hypothetical rail 20 that is positioned lower than the standard location of rail 19. This allows the system 10 to still analyze the rail 18 even where the rail 18 has shifted to a higher or lower location at some position along the railroad track, for example due to damage, design defects, design tolerances, etc.

The system 10 can thus be used to generate data indicative of a variety of different parameters related to the rail being analyzed. These parameters can include a profile of the rail (which can include a cross-sectional image or estimation of the rail), an indication of rail wear (for example due to cracks, flaking, chipping, etc.), an indication of rail alignment, a curvature of the rail, a crosslevel of the rail, a cant of the rail, a gage of the rail, or any combination thereof. These parameters can also include a horizontal distance and a vertical distance between the contact surface of the rail being analyzed and a reference point. In some implementations, the reference point can be the outermost and uppermost corner of the running rail nearest the rail being analyzed. Thus, in the implementation illustrated in FIG. 16, the system 10 may determine the horizontal and vertical distance between the lower surface of the rail 18, and the uppermost and outermost corner 21 of running rail 16.

Figure 17A:
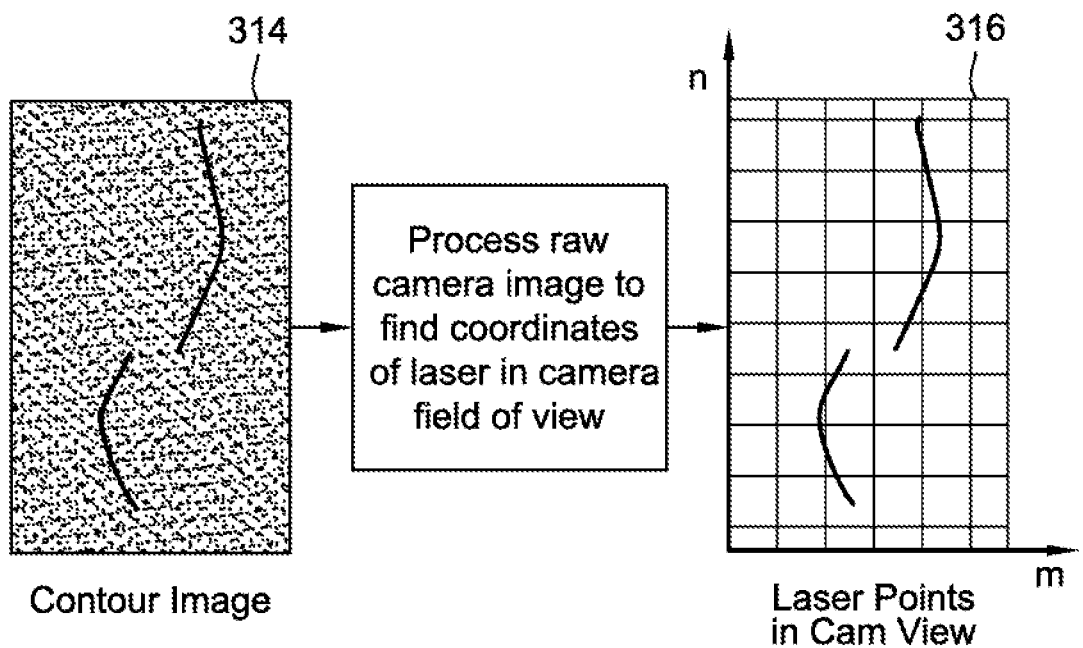
FIG. 17A shows a contour image of the analyzed rail converted to a plot of the location of the rail in a coordinate system of an optical sensor, according to aspects of the present disclosure.
Figure 17B:
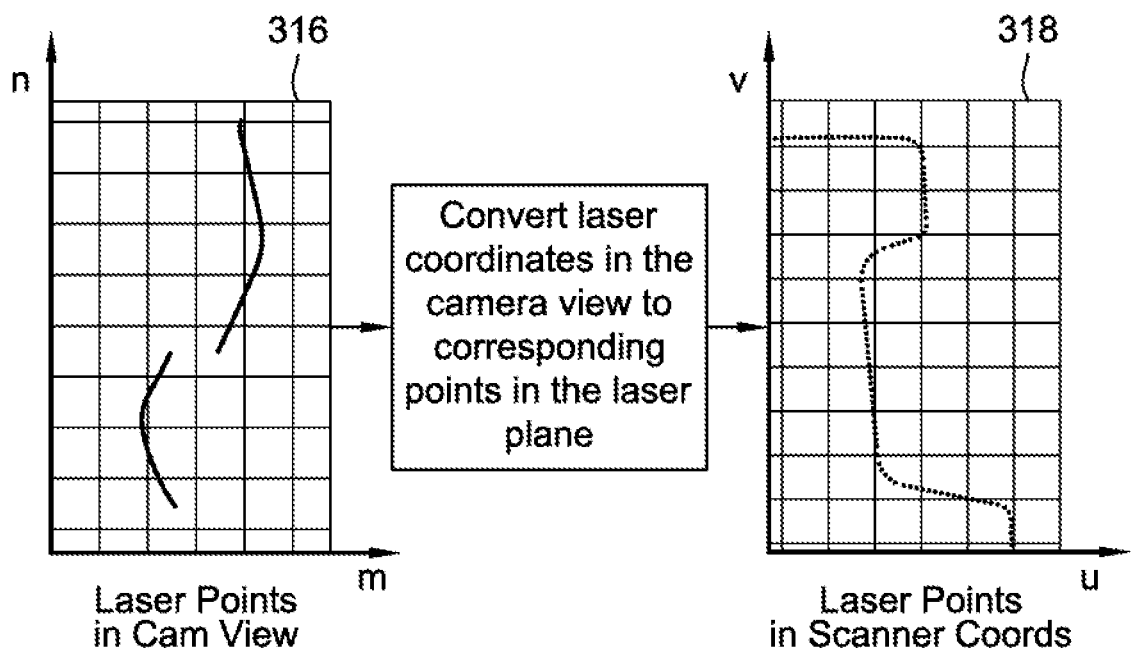
FIG. 17B shows the plot of the location of the rail in the coordinate system of the optical sensor converted to a plot of the location of the rail in a coordinate system of the rail, according to aspects of the present disclosure.

Referring now to FIGS. 17A and 17B, the image data generated by the optical sensor of the optical measurement system can be reproduced as a contour image 314. Contour image 314 shows the emitted electromagnetic radiation that is incident on the rail being analyzed from the point of view of the optical sensor. By processing the contour image 314, a plot 316 of the location of the electromagnetic radiation incident on the rail can be generated. The plot 316 shows the coordinates (m, n) of the electromagnetic radiation incident on the rail from the point of view of the optical sensor. The plot 316 showing the location of the incident electromagnetic radiation can then be converted to plot 318, which shows the location of the incident electromagnetic radiation in coordinates (u, v) that map to actual physical locations of the rail being analyzed. This conversion is generally based on the geometry of the optical measurement system, the reflecting assembly, and the rail being analyzed, including relative locations and relative angles between the components. Once the location of the incident electromagnetic radiation in terms of the location on the rail is determined, various parameters of the rail (including the horizontal and vertical distances between the rail contact surface and the reference point) can be generated.

Some or all of the aspects of the present disclosure can be utilized to analyze a variety of different types or numbers of rails. The rail being analyzed may be conducting or non-conducting rails. The rail being analyzed may be the third or fourth rail on a track with at least two running rails. While the figures herein generally show that the rail being analyzed is located outside of the two running rails, the rail being analyzed could also be positioned between the two running rails. The rail being analyzed can also be a guard rail or a guide rail. Generally, any surface of any rail (such as running rails, electrified rails, guard rails, guide rails, etc.) of a track having any number of rails can be analyzed using the principles discussed herein In some implementations, some or all of the aspects of the invention may be controlled manually by a user (such as an operator on the railroad vehicle), or by one or more processing devices located within the system, on the railroad vehicle, or elsewhere. For example, the retraction assembly and the deployment assembly can be configured to automatically move the reflecting assembly between the stored and deployed positions based on a variety of factors. In some implementations, the reflecting assembly may be moved according to a predetermined schedule.

In still other implementations, the vehicle may include one or more sensors coupled to the vehicle that are configured to detect debris or other foreign objects. Generally, at least one of these sensors is located at least one hundred feet in front of the system relative to the direction of travel, or at least five hundred feet in front of the system relative to the direction of travel. When one of these sensors detects a foreign object that is within a threshold distance from the vehicle, the railroad track, the housing, the reflecting assembly, or any combination thereof, one or both of the housing and the reflecting assembly can be automatically moved to their deployed positions. The sensors thus detect when a foreign object is in a path of the deployed positions of housing or the reflecting assembly, or within some distance away from this path. This distance can be about six inches, about one foot, about five feet, between about six inches and about five feet, or any other suitable distance.

While the present disclosure has been described with reference to one or more particular embodiments or implementations, those skilled in the art will recognize that many changes may be made thereto without departing from the spirit and scope of the present disclosure. Each of these embodiments or implementations and obvious variations thereof is contemplated as falling within the spirit and scope of the present disclosure. It is also contemplated that additional embodiments implementations according to aspects of the present disclosure may combine any number of features from any of the embodiments described herein.

What is claimed is:

1. A deployable measurement system comprising:
   a housing configured to be coupled to a frame of a vehicle that is configured to move along a railroad track having a pair of running rails and a conducting rail;
   a reflecting assembly coupled to the housing such that the reflecting assembly is movable between a stored position and a deployed position, the reflecting assembly including a reflective element that is configured to reflect electromagnetic radiation incident thereon;

a movement assembly coupled to the housing and being configured to cause the reflecting assembly to move (i) from the stored position to the deployed position, (ii) from the deployed position to the stored position, or (iii) both (i) and (ii);

an optical measurement system disposed within the housing and being configured to receive electromagnetic radiation that is reflected by the reflective element, the received electromagnetic radiation being associated with one or more parameters related to the conducting rail; and one or more sensors configured to detect when the reflecting assembly is in the (i) stored position, (ii) the deployed position, or (iii) both (i) and (ii).

2. The deployable measurement system of claim 1, wherein the one or more sensors are further configured to:

generate, based on a determination that the reflecting assembly is in one of the stored position and the deployed position, a signal, wherein the signal indicates that the reflecting assembly is in one of the stored position and the deployed position; and transmit the signal.

3. The deployable measurement system of claim 1, wherein the one or more sensors are one or more of mechanical sensors, electrical sensors, optical sensors, and limit switches.

4. The deployable measurement system of claim 1, wherein the one or more sensors are internal sensors configured to detect movement of an actuator.

5. The deployable measurement system of claim 1, wherein at least a portion of the reflecting assembly is positioned outside of the housing when the reflecting assembly is in the deployed assembly.

6. The deployable measurement system of claim 1, wherein the housing includes a base that forms an opening with a lip about at least a portion of a periphery of the opening.

7. The deployable measurement system of claim 1, wherein the reflective element is positioned at a non-zero angle relative to horizontal in response to the reflecting assembly being in the deployed position.

8. The deployable measurement system of claim 1, wherein the reflecting assembly includes a base plate, an aperture plate, and first and second side bracket, the reflective element being coupled to the base plate, the first side bracket being coupled to a first end of the aperture plate and a first end of the base plate, the second side bracket being coupled to a second opposing end of the aperture plate and a second opposing end of the base plate.

9. The deployable measurement system of claim 8, wherein the first and second side brackets are configured to detach from the aperture plate in response to a force being imparted on the base plate, the first side bracket, the second side bracket, or any combination thereof.

10. The deployable measurement system of claim 9, wherein the force is greater than a detachment threshold, and wherein the detachment threshold is sufficient such that the first and second side brackets do not detach from the aperture plate in the absence of an impact between a foreign object and the base plate, the first side bracket, the second side bracket, or any combination thereof, and such that the first and second side brackets do detach from the aperture plate response to an impact between a foreign object and the base plate, the first side bracket, the second side bracket, or any combination thereof.

11. A deployable measurement system configured to be coupled to a vehicle configured to move along a railroad track, the system comprising:

a housing;

a reflecting assembly coupled to the housing such that the reflecting assembly is movable between a stored position and a deployed position;

a deployment assembly coupled to the housing and being configured to cause the reflecting assembly to move from the stored position to the deployed position such that at least a portion of the reflecting assembly is positioned outside of the housing;

an optical measurement system disposed within the housing and being configured to receive electromagnetic radiation that is reflected by the reflecting assembly in response to the reflecting assembly being in the deployed position; and one or more sensors configured to detect when the reflecting assembly is in the (i) stored position, (ii) the deployed position, or (iii) both (i) and (ii).

12. The deployable measurement system of claim 11, wherein the one or more sensors are further configured to:

generate, based on a determination that the reflecting assembly is in one of the stored position and the deployed position, a signal, wherein the signal indicates that the reflecting assembly is in one of the stored position and the deployed position; and transmit the signal.

13. The deployable measurement system of claim 11, wherein the one or more sensors are one or more of mechanical sensors, electrical sensors, optical sensors, and limit switches.

14. The deployable measurement system of claim 11, wherein the one or more sensors are internal sensors configured to detect movement of an actuator.

15. The deployable measurement system of claim 11, wherein at least a portion of the reflecting assembly is positioned outside of the housing when the reflecting assembly is in the deployed assembly.

16. The deployable measurement system of claim 11, wherein the housing includes a base that forms an opening with a lip about at least a portion of a periphery of the opening.

17. The deployable measurement system of claim 11, wherein the reflective element is positioned at a non-zero angle relative to horizontal in response to the reflecting assembly being in the deployed position.

18. The deployable measurement system of claim 11, wherein the reflecting assembly includes a base plate, an aperture plate, and first and second side bracket, the reflective element being coupled to the base plate, the first side bracket being coupled to a first end of the aperture plate and a first end of the base plate, the second side bracket being coupled to a second opposing end of the aperture plate and a second opposing end of the base plate.

19. The deployable measurement system of claim 18, wherein the first and second side brackets are configured to detach from the aperture plate in response to a force being imparted on the base plate, the first side bracket, the second side bracket, or any combination thereof.

20. The deployable measurement system of claim 19, wherein the force is greater than a detachment threshold, and wherein the detachment threshold is sufficient such that the first and second side brackets do not detach from the aperture plate in the absence of an impact between a foreign object and the base plate, the first side bracket, the second side bracket, or any combination thereof, and such that the first and second side brackets do detach from the aperture plate response to an impact between a foreign object and the base plate, the first side bracket, the second side bracket, or any combination thereof.

\* \* \* \* \*